United States Patent
Kwan et al.

(10) Patent No.: US 11,790,684 B2
(45) Date of Patent: Oct. 17, 2023

(54) SENSOR AND SYSTEM FOR BIOMETRIC SENSING HAVING MULTI-SEGMENT ARCHITECTURE, AND METHODS OF USING THE SAME

(71) Applicant: Next Biometrics Group ASA, Oslo (NO)

(72) Inventors: King Hong Kwan, Bellevue, WA (US); Tian Xiao, Everett, WA (US); Ryan John Higgins, Seattle, WA (US)

(73) Assignee: NEXT Biometrics Group ASA, Oslo (NO)

( * ) Notice: Subject to any disclaimer, the term of this patent is extended or adjusted under 35 U.S.C. 154(b) by 0 days.

(21) Appl. No.: 17/568,181

(22) Filed: Jan. 4, 2022

(65) Prior Publication Data

US 2022/0222964 A1 Jul. 14, 2022

Related U.S. Application Data

(60) Provisional application No. 63/134,966, filed on Jan. 8, 2021.

(51) Int. Cl.
  *G06V 40/13* (2022.01)
  *G06V 40/12* (2022.01)

(52) U.S. Cl.
  CPC ......... *G06V 40/13* (2022.01); *G06V 40/1359* (2022.01)

(58) Field of Classification Search
  CPC ........ G06V 40/13; G06F 3/04; G06F 3/04164
  See application file for complete search history.

(56) References Cited

U.S. PATENT DOCUMENTS

| | | | |
|---|---|---|---|
| 6,091,837 A | 7/2000 | Dinh | |
| 7,910,902 B2 | 3/2011 | Dinh | |
| 8,724,860 B2 | 5/2014 | Dinh | |
| 11,302,112 B1* | 4/2022 | Kumar Agrawal | ... G06F 1/1677 |
| 2006/0217915 A1* | 9/2006 | Dinh | ............ G06V 40/1306 |
| | | | 702/116 |

(Continued)

FOREIGN PATENT DOCUMENTS

WO 2021053219 A1 3/2021

OTHER PUBLICATIONS

European Patent Office, International Search Report and Written Opinion dated May 31, 2022, for corresponding International Patent Application No. PCT/IB2022/000006.

*Primary Examiner* — Joseph R Haley
(74) *Attorney, Agent, or Firm* — Duane Morris LLP

(57) ABSTRACT

A multi-segment pixel matrix, a sensor or device, a system, and a method, for biometric sensing, are provided. Such a device or system includes a sensor comprising a pixel matrix having two or more pixel arrays as separate segments logically divided in the pixel matrix. The pixel matrix may include both thermal sensing pixels and capacitive sensing nodes. The device or system may include a plurality of application-specific intergrade circuits (ASICs) coupled to the sensor. Each ASIC is configured to capture image data of a biometric pattern measured by at least one pixel array. Each pixel array is independently driven and scanned by one or more of the plurality of the ASICs. The device or system further includes a microcontroller unit coupled to the plurality of ASICs and are used to process the image data and/or control operation of the system. Such a sensor can be a fingerprint sensor.

26 Claims, 15 Drawing Sheets

(56) References Cited

U.S. PATENT DOCUMENTS

| | | | |
|---|---|---|---|
| 2014/0333328 A1 | 11/2014 | Nelson et al. | |
| 2016/0162102 A1* | 6/2016 | Shahparnia | G06F 3/0446 |
| | | | 345/174 |
| 2016/0232395 A1* | 8/2016 | Han | G06F 1/1626 |
| 2017/0010706 A1* | 1/2017 | Cok | H01L 27/156 |
| 2017/0255294 A1* | 9/2017 | Shepelev | G06F 3/04182 |
| 2021/0365169 A1* | 11/2021 | Liu | G06F 3/04166 |
| 2022/0164103 A1* | 5/2022 | Fang | G06F 3/0443 |

* cited by examiner

SENSOR AND SYSTEM FOR BIOMETRIC SENSING HAVING MULTI-SEGMENT ARCHITECTURE, AND METHODS OF USING THE SAME

PRIORITY CLAIM AND CROSS-REFERENCE

This application claims the benefit of U.S. Provisional Application No. 63/134,966, filed Jan. 8, 2021, which application is expressly incorporated by reference herein in its entirety.

FIELD OF THE INVENTION

The disclosure relates to a device or apparatus and a method for measuring patterns in a partially heat conducting surface generally. More particularly, the disclosed subject matter relates to a device or apparatus for biometric sensing such as a fingerprint sensor, a system, and a method for measuring or capturing an image of a biometric (e.g., fingerprint) pattern.

BACKGROUND

Fingerprint sensors are one form of technology used to provide biometric security. The fine patterns formed by ridges and valleys on the finger's skin can be mapped by sensing arrays, which vary in basic operating principles. Some sensors utilize heat signals, while others utilize electrical, pressure, or optical signals. Active sensors quantify a specific physical parameter response to a given stimulus. Accuracy levels are limited by the physical principles used to read fingerprint patterns. Furthermore, immunity to environmental variables such as dirt or humidity is also important when performing a fingerprint scan.

Fingerprint sensors are often used in electronic devices to verify the identity of the user and to restrict access unless the sensor verifies that an authorized user is attempting to use the device. For example, certain smart credit cards require verification of the user via a fingerprint sensor before use. Fingerprint sensors are also included in computing devices—such as smartphones, tablet computers, laptops, and point of sale devices—to ensure that only authorized users are able to unlock and use such devices.

SUMMARY OF THE INVENTION

The present disclosure provides a multi-segment pixel matrix, a sensor or device, a system, and a method, for biometric sensing.

In accordance with some embodiments, a system for biometric sensing comprises a sensor, which comprises a pixel matrix having two or more pixel arrays as separate segments logically divided in the pixel matrix. The system further comprises a plurality of application-specific intergrade circuits (ASICs) coupled to the sensor. Each ASIC is configured to capture image data of a biometric pattern of an object measured by at least one pixel array. Each pixel array is configured to be independently driven and scanned by one or more of the plurality of the ASICs. The system may further comprise a microcontroller unit (MCU) coupled to the plurality of ASICs. The MCU comprises one or more processor and at least one tangible, non-transitory machine readable medium encoded with one or more programs configured to process the image data and/or control operation of the system. In some embodiments, the plurality of ASICs and the sensor are disposed together within a biometric sensing device.

In some embodiments, the pixel matrix comprises any suitable number of pixel arrays, for example, from 2 to about 12 pixel arrays. The number of the pixel arrays (or segments) can be any integer in a range of from 2 to 12.

The sensor may further comprise a plurality of supporting circuits. Each pixel array is connected with at least one supporting circuit. In some embodiments, the sensor in the system may further comprise a plurality of switches. Each switch is connected with one or more supporting circuits and one or more ASICs. Each pixel array is configured to be independently driven and scanned by one or more of the plurality of the ASICs through one or more switches.

In some embodiments, each pixel array comprises a plurality of pixels arranged in a plurality of rows and a plurality of columns. Each pixel array comprises thermal sensing pixels, which are configured to operate based on the active thermal sensing principle, in which a power heat pulse is applied to each pixel array and a response corresponding to a biometric pattern is measured. For thermal sensing, a pixel in each pixel array may comprise one or more diodes connected in series between a pixel row line and a pixel column line.

In accordance with some embodiments, each pixel array further comprises a capacitive sensing grid comprising capacitive sensing nodes distributed in each pixel array. The system or device may further comprise an auxiliary circuit for the capacitive sensing grid in a respective ASIC or in the MCU or outside the respective ASIC or the MCU as an independent integrated circuit. The capacitive sensing grid is connected with the auxiliary circuit.

Through the MCU, the system is configured to perform the functions and steps as described herein. For example, the steps comprise: detecting a presence of an object having a biometric pattern on the sensor, performing a coarse scan by scanning a fraction of pixels in a pixel array to determine a contact boundary between the object and the sensor, and performing a detailed scan selectively within the contact boundary to provide the image data of the biometric pattern. The steps may also include those for detecting rolling motion and location, combining images, and processing and comparing image data as described in the present disclosure.

In another aspect, the present disclosure provides a sensor or device for biometric sensing. Such a device comprises a sensor comprising a pixel matrix having two or more pixel arrays as separate segments logically divided in the pixel matrix, and a plurality of application-specific intergrade circuits (ASICs) coupled to the sensor. Each ASIC is configured to capture image data of a biometric pattern of an object measured by at least one pixel array. Each pixel array is configured to be independently driven and scanned by one or more of the plurality of the ASICs. In some embodiments, the sensor is a fingerprint sensor, the object is a finger, and the biometric pattern is a fingerprint.

In some embodiments, each pixel array comprises a plurality of pixels arranged in a plurality of rows and a plurality of columns, and the plurality of pixels comprise thermal sensing pixels. Each pixel array may further comprise a capacitive sensing grid comprising capacitive sensing nodes distributed in each pixel array. The capacitive sensing grid is configured to detect a presence of the object, and/or rolling motion and location of the object. The capacitive sensing nodes may be mutual capacitance sensing nodes or self-capacitance sensing nodes. The self-capacitance sensing nodes are configured to be passive-matrix addressed, or active-matrix addressed by an array of thin film transistors. The mutual capacitance sensing nodes are configured to be passive-matrix addressed.

The device may further comprise the switches as described herein. The device may also comprise a microcontroller unit (MCU) coupled to the plurality of ASICs. The MCU comprises one or more processor and at least one tangible, non-transitory machine readable medium encoded with one or more programs configured to process the image data and/or control operation of the device as described herein.

In another aspect, the present disclosure provides a method of using a device or a system comprising a sensor comprising a pixel matrix having two or more pixel arrays as separate segments logically divided in the pixel matrix. Such a method comprises steps of: detecting a presence of an object having a biometric pattern on the sensor, performing a coarse scan (a pre-scan) by scanning a fraction of pixels in a pixel array to determine a contact boundary between the object and the sensor, and performing a detailed scan selectively within the contact boundary to provide the image data of the biometric pattern.

In some embodiments, the sensor is a fingerprint sensor, the object includes at least one finger, and the biometric pattern is a fingerprint.

As described herein, each pixel array comprises a plurality of pixels arranged in a plurality of rows and a plurality of columns. The plurality of pixels comprise thermal sensing pixels. Each pixel array may further comprise a capacitive sensing grid having capacitive sensing nodes distributed in each pixel array.

In such a method, the presence of an object such as a finger touch on the sensor is detected through the thermal sensing pixels or the capacitive sensing nodes. The coarse scan and the detailed scan are performed through the thermal sensing pixels.

Such a method may further comprise dynamically tracking rolling motion and location of the object through a capacitive scan using the capacitive sensing nodes. The method may further comprise a step or steps for combining biometric images of the object captured through thermal scans during the rolling motion of the object to provide a complete biometric pattern using the MCU.

In some embodiments, the capacitive sensing nodes are mutual capacitance sensing nodes or self-capacitance sensing nodes. The self-capacitance sensing nodes may be passive-matrix addressed, or active-matrix addressed by an array of thin film transistors. The mutual capacitance sensing nodes are configured to be passive-matrix addressed.

The sensor, the device, the system, and the method provided in the present disclosure provide significant benefits, which the existing technologies cannot provide. For example, the technology provided in the present disclosure provide faster scan time, lower total power consumption, improved image scan bandwidth, capability of scanning a moving/rolling object (such as a finger or multiple fingers), and high resolution. For example, a large fingerprint sensor or system can be provided to meet fingerprint acquisition profile (FAP) standards.

BRIEF DESCRIPTION OF THE DRAWINGS

The present disclosure is best understood from the following detailed description when read in conjunction with the accompanying drawings. It is emphasized that, according to common practice, the various features of the drawings are not necessarily to scale. On the contrary, the dimensions of the various features are arbitrarily expanded or reduced for clarity. Like reference numerals denote like features throughout specification and drawings.

DETAILED DESCRIPTION

Figure 1:
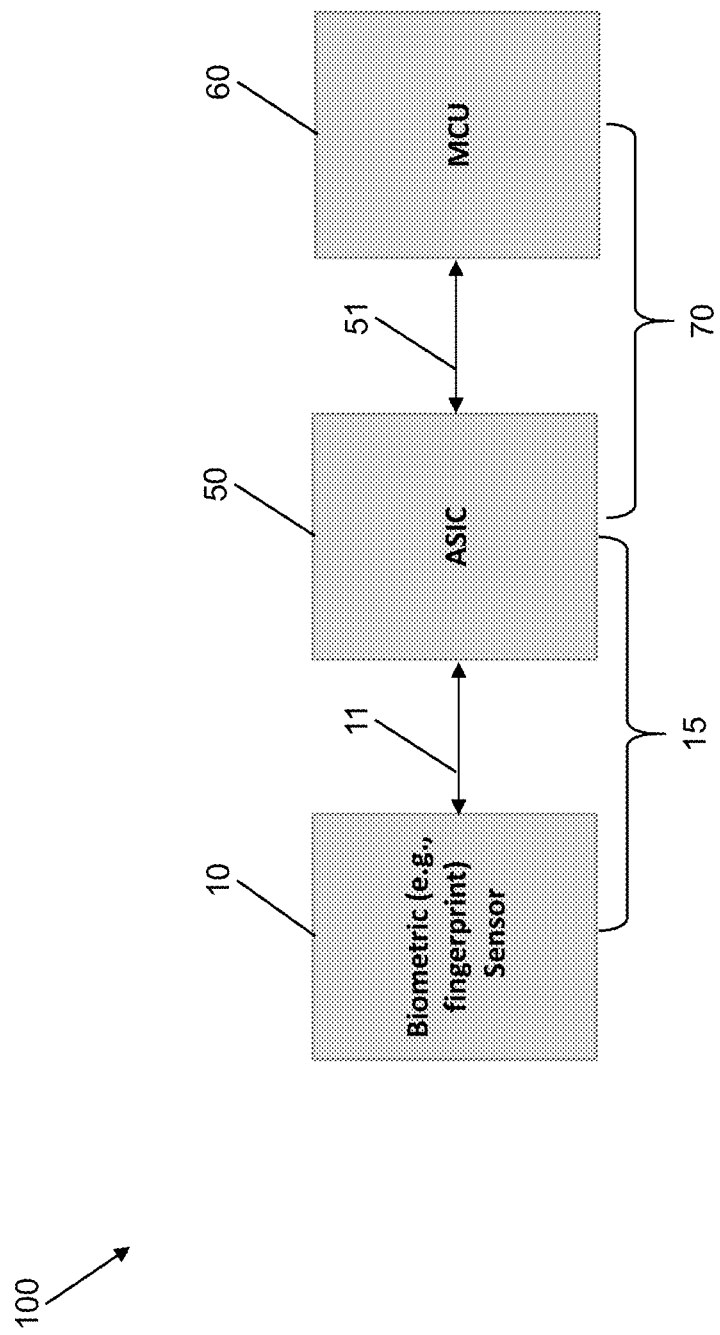
FIG. 1 is a block diagram illustrating an exemplary system such as biometric sensor system in accordance with some embodiments.

This description of the exemplary embodiments is intended to be read in connection with the accompanying drawings, which are to be considered part of the entire written description. In the description, relative terms such as "lower," "upper," "horizontal," "vertical,", "above,"

"below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

For purposes of the description hereinafter, it is to be understood that the embodiments described below may assume alternative variations and embodiments. It is also to be understood that the specific articles, compositions, and/or processes described herein are exemplary and should not be considered as limiting.

In the present disclosure the singular forms "a," "an," and "the" include the plural reference, and reference to a particular numerical value includes at least that particular value, unless the context clearly indicates otherwise. When values are expressed as approximations, by use of the antecedent "about," it will be understood that the particular value forms another embodiment. As used herein, "about X" (where X is a numerical value) preferably refers to ±10% of the recited value, inclusive. For example, the phrase "about 8" preferably refers to a value of 7.2 to 8.8, inclusive. Where present, all ranges are inclusive and combinable. For example, when a range of "1 to 5" is recited, the recited range should be construed as including ranges "1 to 4", "1 to 3", "1-2", "1-2 & 4-5", "1-3 & 5", "2-5", and the like. In addition, when a list of alternatives is positively provided, such listing can be interpreted to mean that any of the alternatives may be excluded, e.g., by a negative limitation in the claims. For example, when a range of "1 to 5" is recited, the recited range may be construed as including situations whereby any of 1, 2, 3, 4, or 5 are negatively excluded; thus, a recitation of "1 to 5" may be construed as "1 and 3-5, but not 2", or simply "wherein 2 is not included." It is intended that any component, element, attribute, or step that is positively recited herein may be explicitly excluded in the claims, whether such components, elements, attributes, or steps are listed as alternatives or whether they are recited in isolation.

Unless expressly indicated otherwise, the term "connected" or "coupled" used herein are understood to encompass different connections or coupling between or among the components so as to conduct electricity or transmit signals for communication. Such a connection or coupling can be through wire, wireless, or cloud-based modes.

The present disclosure provides a multi-segment pixel matrix, a sensor or device, an apparatus, a system, and a method, for sensing such as biometric sensing. The present disclosure also provides a method of making the multi-segment pixel matrix, the sensor, the device, an apparatus, and a system. The present disclosure is described using finger as an exemplary object and fingerprint as an example of biometric pattern, for the purpose of illustration only. The products and the method provided in the present disclosure can be used for measuring patterns in a partially heat conducting surface of an object in general. For example, such an object can be a hand palm or a skin in other parts of a human body.

Large fingerprint sensing area has been highly desirable because it captures more fingerprint information in a single scan providing higher identification accuracy with lower false acceptance and false rejection rate. At the same time, a high fingerprint scan resolution is necessary to obtain a high-quality fingerprint image precisely capturing the fingerprint minutiae, ridge contours and edge features. Such detail is crucial for a high confidence fingerprint matching and enables anti-spoofing capability to differentiate between real and fake fingers. The FBI certified Personal Identity Verification (PIV) and Image Quality Standard (IQS) require a minimum sensor resolution of 500 dpi. Both large sensing area and high scan resolution requirements imply that the sensing system must have sufficiently high bandwidth to collect complete fingerprint image from a large number of pixels on the sensor within a reasonable scan time.

Large fingerprint sensor capable of simultaneously scanning multiple fingers are gaining popularity in consumer electronics and is becoming increasingly essential for law enforcement agencies, border patrol, and other high security applications. In particular, FAP60 fingerprint sensor, which can simultaneously scan four fingers and capture a continuous fingerprint from a rolling finger is the de-facto standard for government offices, custom immigration, and military applications. Therefore, to meet the increasing demands, the next generation fingerprint sensor must have extremely high image scan and processing bandwidth capable of collecting high resolution fingerprint image from an ultra large sensing area, identifying multiple individual fingerprints, as well as dynamically collecting fingerprint from a moving finger rolling across the sensor.

The active thermal principle is one of the preferred solutions for implementing ultra large and high-resolution fingerprint acquisition profile (FAP) standard fingerprint sensors. It is inherently immune to sunlight interference and works well with wet or sweaty fingers. It offers a thin form factor, lightweight and cost-effective alternative to the optical counterparts. These features are highly desirable for integrating into mobile applications and for wider adoption in civilian applications. This technology provided in the present disclosure significantly improves the scan bandwidth, scan time and energy consumption by adopting a new sensing system architecture enabling the next generation active thermal sensor to be competitive against the optical sensors.

The present disclosure is described with selective active thermal sensing as the main scan method. The technology such as multi-segment architecture as described herein may be also used for the sensor and the system with the optical scan as the main scan method.

In FIGS. 1-14, like items are indicated by like reference numerals, and for brevity, descriptions of the structure, provided above with reference to the preceding figures, are not repeated. The methods described in FIGS. 7-8 and 11-15 are described with reference to the exemplary structure described in FIGS. 1-6 and 9.

FIG. 1 is a schematic diagram of an exemplary system such as a biometric sensor system 100 in accordance with some embodiments. Such an exemplary system can be one possible architecture for a biometric system.

Referring to FIG. 1, in the illustrated embodiment, the biometric sensor system 100 includes a biometric (e.g., fingerprint) sensor 10, an image capture application-specific integrated circuit ("ASIC") 50, and a microcontroller unit ("MCU") 60. The ASIC 50 is in communication with the biometric sensor 10 through interface 11, and the MCU 60 is in communication with the ASIC 50 through interface 51. Either or both of the ASIC 50 and the MCU 60 may be embedded in one chip. The biometric sensor 10 is configured, under control of the ASIC 50, to capture an image of a biometric pattern such as a fingerprint and transmit image data as signals through the interface 11. In some embodiments, the biometric sensor 10 outputs analog signals, and interface 11 is an analog interface. The ASIC 50 can receive the analog signals and perform an analog-to-digital conversion ("A/D conversion") before sending the image data to the MCU 60.

Alternatively, in some embodiments, the A/D conversion can occur within fingerprint sensor 10 such that biometric sensor 10 outputs a digital signal and interface 11 is a digital interface. For example, in embodiments in which the biometric sensor 10 includes a matrix of pixels (as described below), each pixel may include A/D conversion and output a digital signal to the ASIC 50. In some embodiments, the fingerprint sensor 10 can output the digital signal directly to the MCU 60. The interface 11 also carries various other signals from the biometric sensor 10. The ASIC 50 and/or MCU 60 can evaluate those signals to determine a presence and location of a specimen on the biometric sensor 10. That information is used by the ASIC 50 and/or MCU 60 to control scanning. For example, the ASIC 50 and/or MCU 60 can identify a sub-portion of the biometric sensor 10, and the ASIC 50 can direct the biometric sensor 10 to scan only the sub-portion.

The ASIC 50, which can be a processing chip, reads the image data from the biometric sensor 10 and transfers it to the MCU 60 via the interface 51 (e.g., SPI, USB, or other suitable interface). The MCU 60 processes the image data, extracts characteristic features, and generates a fingerprint template (e.g., an image of the fingerprint), for example, based on so-called "minutiae" in the image data. In some embodiments, the MCU 60 is provided with a fingerprint matching functionality that compares the fingerprint template to one or more stored fingerprints (e.g., corresponding to the fingerprints of authorized persons) to determine whether the template matches any of the stored fingerprints. In some embodiments, the ASIC 50 and the MCU 60 are components of an image acquisition controller 70. In various embodiments, the image acquisition controller 70 also includes one or more processors (not shown), which may be part of a host system (e.g., a smartphone, smart card, etc.) into which the biometric sensor system 100 is integrated.

In various embodiments, the functionality of ASIC 50, MCU 60, the image acquisition controller 70, and/or a smart card chip (not shown) can be integrated into a single chip or chips within the host system. For example, the biometric sensor system 100 may be used in a mobile phone, a personal computer, an access control system, a USB reader, a point of sale terminal, a smart card, or any other appropriate application. In some embodiments, such as for smart credit card embodiments, the fingerprint template may be transferred to a smart card chip (integrated circuit card chip, ICC) where the storage and matching is performed in a so-called on-card biometric comparison application, sometimes also called "match on card" or "match on SE" (secure element).

In accordance with some embodiments, the MCU 60 itself can be the controller for the system 100, and is configured to control the operation of the whole fingerprint module or system 100. For example, the functions of the MCU 60 may range from detecting finger presence, collecting or scanning for fingerprint, to processing the image and encrypting the image to a host. Sometimes the functions of the MCU 60 may depend on how much a user wants to be done in the MCU 60. In some embodiments where "match on chip" is required, the MCU 60 compares the collected fingerprint and determine if it matches the one previously stored in the MCU 60. In some embodiments, the user may want the MCU 60 just to provide a complete image and the image will be "matched" in the host system (e.g., MSFT Windows Hello). However, in some other applications, a user may want to have more control over the module operation and the MCU 60 is configured to perform in respond to the specific commands from the host.

Figure 2:
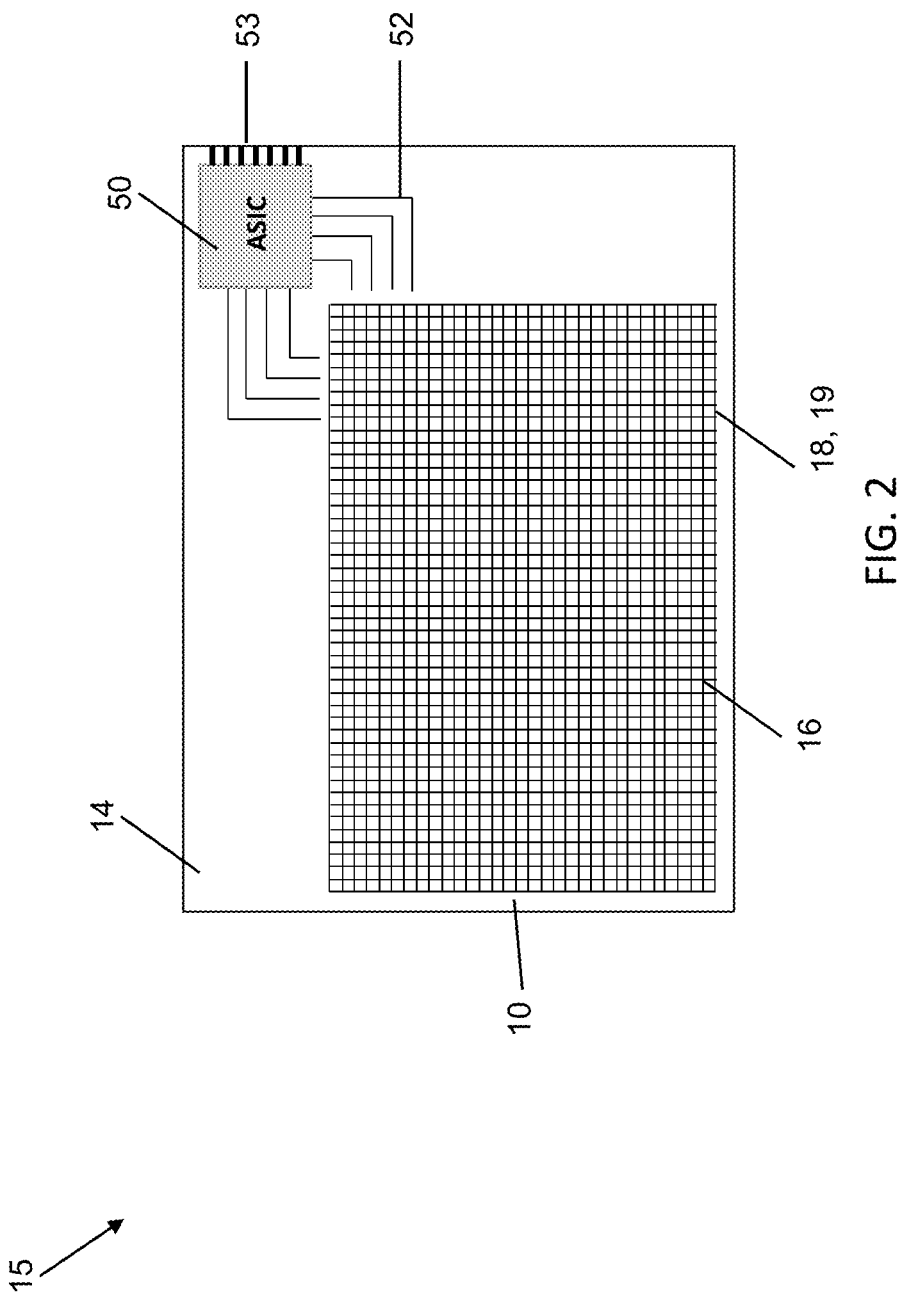
FIG. 2 shows a schematic illustration of an exemplary sensor or device such as a fingerprint sensor or device in accordance with some embodiments.

Referring to FIGS. 1 and 2, in some embodiments, both the fingerprint sensor 10 and the ASIC 50 may be disposed on one substrate, and are referred as a fingerprint sensor or a fingerprint sensing device 15. FIG. 2 is a partially schematic illustration of an exemplary biometrics (e.g., fingerprint) sensor or biometric (e.g., fingerprint) sensing device 15 in an exemplary system in accordance with some embodiments. The MCU 60 may be disposed in the biometric sensing device 15, or separate from while connected with the biometric sensing device 15.

Referring to FIG. 2, in the illustrated embodiment, the biometric sensing device 15 comprises a biometric sensor 10, which comprises a substrate 14, a pixel matrix 16 for the biometric sensor 10, circuitry 52, and connection points 53. The pixel matrix 16 may be one or more pixel arrays (i.e., a multi-segment pixel matrix or array) as described herein. In some embodiments, the ASIC 50 can be mounted to the substrate 14, for example, as shown in FIG. 2. In some embodiments, the biometric sensor 10 is a flexible sensor and substrate 14 is a flexible material. In various embodiments, the substrate 14 can also be constructed from a polymer, a metal foil, a semiconductor material, quartz, glass, or any other materials or a combination thereof, which is suitable for depositing microelectronic structures in production. Examples of a suitable polymer material include, but are not limited to, polyethylene terephthalate (PET), polyethylene naphthalate, and polyimide. Examples of a suitable metal foil include, but are not limited to, steel, aluminum, and a metal alloy. Examples of a suitable semiconductor material include, but are not limited to, silicon and an III-V semiconductor material. In some embodiments, the substrate 14 is made of a flexible material such as polyimide and a metal foil.

As illustrated in FIG. 2, the pixel matrix 16 is positioned over a surface of the substrate 14. In some embodiments, the pixel matrix 16 is formed over the surface of the substrate 14 using a thin film transistor (TFT) fabrication process or other deposition process. For example, a low temperature poly-silicon (LTPS) fabrication process can be used. The connection points 53 are electrically coupled to the pixel matrix 16, for example, communicatively via the ASIC 50, and allow for connection to an external system, for example, the MCU 60 (FIG. 1). In some embodiments, a protective coating (not illustrated) may be applied over pixel matrix 16. As will be described further herein, the surrounding circuitry 52 includes address lines that allow certain rows or columns of pixel matrix 16, or rows or column in a certain area of the pixel matrix 16, to be selectively scanned or read.

In various embodiments, the biometric sensor 10 operates on the active thermal sensing principle. In such embodiments, a low power heat pulse is applied to each sensor pixel over a short period of time and a response is measured. This type of fingerprint sensor can be produced through large area production processes, such as those that form LTPS thin film transistors and devices. Based on the active thermal principle, active thermal sensors measure the heat conductance of an object for a given heating stimulus. Examples of the active thermal sensing principle suitable for the biometric sensor 10 in the present disclosure are disclosed in U.S. Pat. No. 6,091,837 to Dinh, entitled "Sensor for Acquiring a Fingerprint Image Based on Heat Transfer" and U.S. Pat. No. 8,724,860, also to Dinh, entitled "Apparatus for Fingerprint Sensing and Other Measurements," the entireties of each of which are incorporated by reference herein. The response to the stimulus is measured by each of the sensing sites within a sensor array. The thermal response of an element is in part a function of the stimulus provided, i.e., the larger the stimulus, the larger the response. Sensing sites are heated by application of an electrical current to the site.

The thermal sensor principle utilizes heat transfer mechanism in order to distinguish fingerprint valleys and ridges, as their skin structures have different heat transfer characteristics. A short heat pulse is applied to selected pixels in a sensor array (or a portion of a sensor array as described herein), and the heat exchange between the finger and the underlying individual sensors is monitored through a sensor temperature variation measurement. A relatively high sensor temperature indicates a little heat loss or a small heat exchange between the considered sensor and the finger at this point because of low thermal conductivity. The points with low thermal conductivity map the local fingerprint valley structure, and the points with high thermal conductivity, i.e., having high heat conduction/transfer, map the local fingerprint ridges structure. Intermediate thermal conductivity points correspond to the local transition zone between ridges and valleys. The temperature differences are measured using sensing elements (e.g., fingerprint sensor pixels), and the measurements are processed to generate an image of the fingerprint on the fingerprint sensor.

Each pixel array described herein comprises sensor element or pixel 18 such as thermal sensing pixels 19 (as illustrated in FIG. 2). A pixel array may be a two-dimensional network of pixels 18. In some embodiments, a pixel or sensor element may include one or more diodes connected in series between a pixel row line and a pixel column line. The diodes are close to the sensor surface and in good thermal contact with a fingerprint to be measured, and may act as both pixel heater and temperature sensing element.

The pixel heating power is proportional to the product of the number of the diodes, a given current and voltage across each diode. The diodes are temperature sensitive, and any temperature change in a pixel reflects a corresponding change in voltage if the current is biased, or reflects a corresponding change in current if the voltage is biased.

The pixel diodes can be any microelectronic device construction, with either purely or combined rectifying characteristic. Examples of a suitable diode include, but are not limited to a PN-junction rectifier, a Schottky rectifier, a PIN diode, or any combination thereof. The diodes may be constructed from a compound-semiconductor such as germanium or silicon, or metal such as aluminum with suitable properties, or from organic materials. The atomic structures may be mono-crystalline, amorphous or poly-crystalline.

The pixels may be covered with a conductive or semiconductor layer (not shown), which can be grounded to shield and protect the sensor. A protective coating (not shown) may be coated on the conductive or semiconductor layer to provide mechanical and chemical protection during uses.

Table 1 summarizes the fingerprint acquisition profile (FAP) standard sensor specifications, which are defined in the FBI specification PIV-071006 and Electronic Biometric Transmission Specifications (EBTS) Appendix F. The total number of pixels of FAP60 sensor is 20 times more than FAP20 sensor. Therefore, the FAP60 sensing bandwidth and throughput must be proportionally scaled up to stay within a reasonable scan time.

TABLE 1

|  | FAP20 | FAP30 | FAP40/45 | FAP50 | FAP60 | Unit |
|---|---|---|---|---|---|---|
| Pixels | 400 × 300 | 500 × 400 | 800 × 750 | 1600 × 1000 | 1600 × 1500 | — |
|  | 120k | 200k | 600k | 1600k | 2400k | pixels |
| Resolution |  |  | 500 |  |  | dpi |
| Dimensions | 0.8 × 0.6 | 1.0 × 0.8 | 1.6 × 1.5 | 3.2 × 2.0 | 3.2 × 3.0 | inch |
|  | 20.3 × 15.2 | 25.4 × 20.3 | 40.6 × 38.1 | 81.3 × 50.8 | 81.3 × 76.2 | mm |
| Active Area | 309.7 | 516.1 | 1548.4 | 4129.0 | 6193.5 | mm$^2$ |
|  | 1 | 1.67 | 5.0 | 13.3 | 20.0 | (normalized) |
| Number of Fingerprint | 1 | 1 | 2 | 4 | 4 | — |

Figure 3:
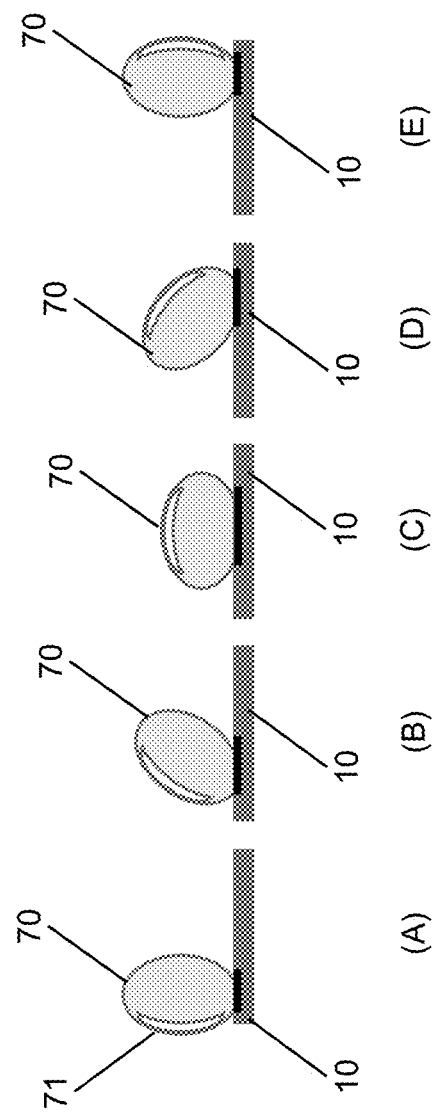
FIG. 3 illustrates different contact areas of a rolling finger on a fingerprint sensor.

Another challenge for the next generation fingerprint sensor is to capture a continuous fingerprint from a rolling finger as illustrated in FIG. 3. As illustrated in FIG. 3, from position (A), to (B), to (C), to (D), and then to (E), a finger 70 having a finger nail 71 is rolled from one side to the other side on a sensor 10. The finger nail 71 is on one side (i.e., top side) of the finger 70, while the fingerprint is on the opposite of the finger 70. In the position (C), the finger 70 is pressed onto the sensor 10 and has the largest contacting area. Unlike stationary finger, only a portion of the full fingerprint is in contact with the sensor 10 available for image capture at any given moment. Each partial fingerprint of a rolling finger will only briefly contact the sensing surface leaving a short time window to properly capture the moving fingerprint. This requires not only a high bandwidth sensing system, but also an intelligent sensing system to accurately locate and track the finger movement allocating the available scan resources to generate a high-quality fingerprint image.

This present disclosure enables and provides large area fingerprint sensors meeting various FAP specifications up to FAP60 based on active thermal sensing principle by expanding the sensing bandwidth.

In accordance with some embodiments, an exemplary system 100 for biometric sensing comprises a sensor 10, which comprises a pixel matrix 16 having two or more pixel arrays (e.g., 36A, 36B, 36C and 36D in FIGS. 4B-4C, 5B and 6) as separate segments logically divided in the pixel matrix 16. A pixel matrix is logically divided into multiple segments.

The terms "logical division" or "logically divided" used herein refer to that a pixel array (i.e., a full pixel array) is re-arranged or sub-divided into multiple segments (multiple pixel arrays) to facility the image collection or image sensing. No visual boundary or physical gaps exist between the sub-divisions that a user will notice. "Logical division" in electrical engineering in general refers to logically sub-divide a larger task into several smaller tasks to improve performance, while all the tasks may be treated or processed in the same way consistently and uniformly.

Figures 4A, 4B, 4C:
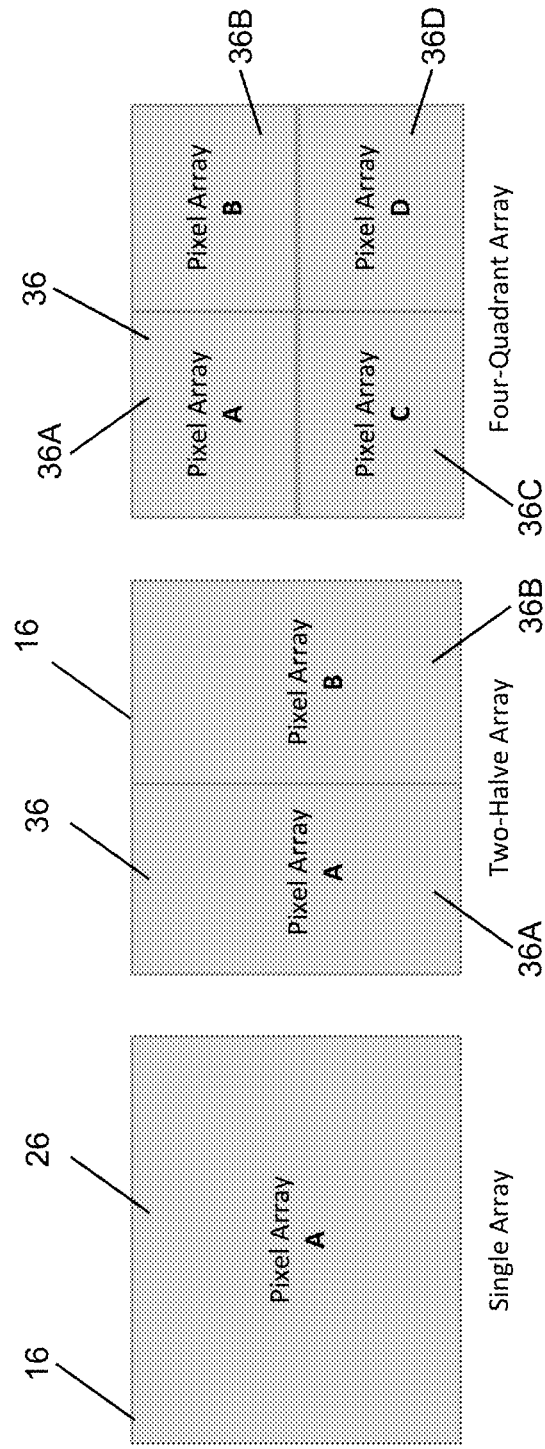
FIG. 4A illustrates a pixel array in some embodiments.
FIGS. 4B-4C illustrates two exemplary pixel matrices with multi-segment sensing areas and pixel arrays in accordance with some embodiments.

Referring to FIG. 4A, the pixel matrix 16 includes one single pixel array 26.

Referring to FIGS. 4B and 4C, two exemplary pixel matrices 16 have multi-segment image sensing and processing architecture are shown. As illustrated in FIGS. 4B-4C, each pixel matrix 16 has multiple pixel arrays 36 logically divided in the pixel matrix 16. In FIG. 4B, two pixel arrays 36 (A, B) are shown. In FIG. 4C, four pixel arrays 36 (A, B, C, D) are shown. Such a new sensor architecture is designed and configured that the large sensing area can be logically divided into multiple segments, and each individual pixel array (or segment) can be independently controlled by a corresponding driving circuit. The logical division does not affect pixel dimensions and image resolution, and there is no physical gap between the adjacent segments. This partition allows the active sensing area to be scanned in parallel by multiple ASICs 50.

In some embodiments, the pixel matrix comprises any suitable number of pixel arrays, for example, from 2 to about 12 pixel arrays, from 2 to 8 pixel arrays, from 2 to 6 pixel arrays, from 2 to 4 pixel arrays. The number of the pixel arrays (or segments) can be any integer in a range of from 2 to 12. For example, the number of pixel arrays or segments may be 2, 3, 4, 5, 6, 7, or 8. The number of pixel arrays or segments is not limited by the algorithm used in the microcontroller, but may be limited by physical implementation in the device fabrication. For example, for some IC or TFT processes with only 2 to 3 metal layers, the number of pixel array may be low, for example, about 2-4 pixel arrays. For another example, for a process with 6 or more metal routing layers, more pixel arrays such as 8 or more than 8 arrays can be readily supported.

As described in FIG. 2, in some embodiments, each pixel array 36 comprises a plurality of pixels arranged in a plurality of rows and a plurality of columns. Each pixel array may have a respective invisible boundary. Each pixel array 36 comprises thermal sensing pixels, which are configured to operate based on the active thermal sensing principle, in which a power heat pulse is applied to each pixel array and a response corresponding to a biometric pattern is measured. For thermal sensing, a pixel in each pixel array may comprise one or more diodes connected in series between a pixel row line and a pixel column line.

Figures 5A, 5B:
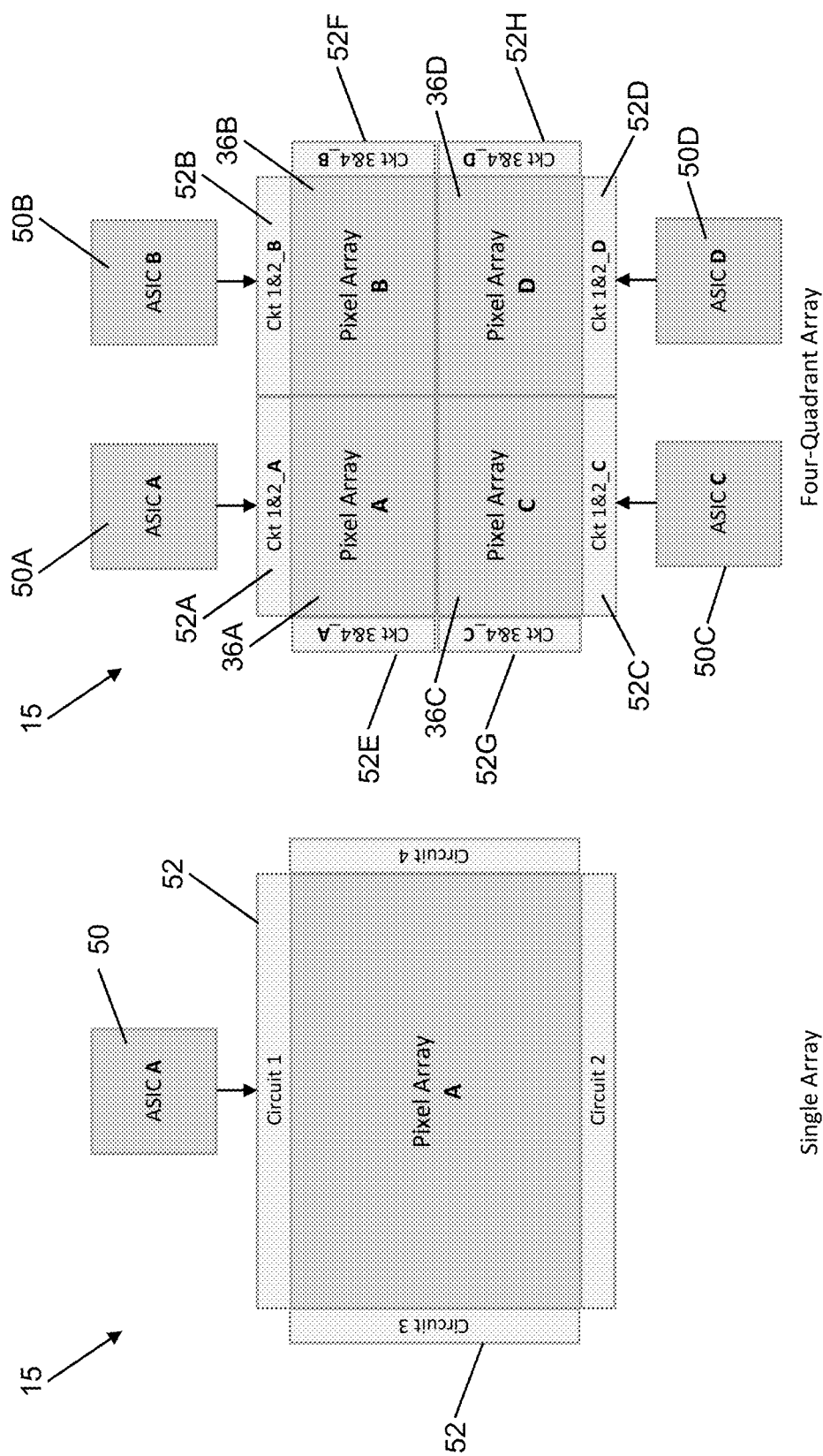
FIG. 5A illustrates a device such as a fingerprint sensor having the pixel array of FIG. 4A in some embodiments.
FIG. 5B illustrates an exemplary device such as a finger sensor having a multi-segment pixel matrix (e.g., that of FIG. 4C for illustration) in accordance with some embodiments.

Referring to FIGS. 5A-5B, as also described in FIGS. 1-2, the sensor or the sensing device 15 includes at least one application-specific intergrade circuits (ASIC) 50 and at least supporting circuits 52.

FIG. 5A shows an exemplary device 15 including a single pixel array 26. FIG. 5B illustrates an exemplary sensor or device 15 comprising multiple pixel arrays 36. As shown in FIG. 5B, the sensor or device 15 may further comprise a plurality of ASICs 50 (labeled as 50A, 50B, 50C, and 50D) and a plurality of supporting circuits 52 (labeled as 52A, 52B, . . . 52H). Each pixel array 36 is connected with at least one supporting circuit 52. Each ASIC 50 is configured to capture image data of a biometric pattern of an object measured by at least one pixel array 36. Each pixel array 36 is configured to be independently driven and scanned by one or more of the plurality of the ASICs 50. In FIG. 5B, "Ckt" means "circuit." Sometimes, one ASIC 50 may be directed to scan image across multiple pixel arrays 36. On the other hand, one pixel array 36 can be driven by multiple ASICs 50. There might be multiple such as four different types of supporting circuits around a pixel array for delivering the input signal to the corresponding pixels during scan and for collecting the corresponding analog data to an ASIC 50 to generate a fingerprint image. The circuits are similar to the decoder circuit and readout circuit for SRAM or any memory product.

In some embodiments, each pixel array or segment 36 is driven and scanned by an individual ASIC (FIG. 5B). If the active sensing area is logically divided into 4 segments, 4 ASICs 50 are configured to work in parallel. Image scan bandwidth is increased by 4 times, and it takes about a quarter of the original scan time to collect a full image. In other words, the scan time to collect a full image is reduced to 1/N of the original scan time, where N is the number of divided segments.

Figure 6:
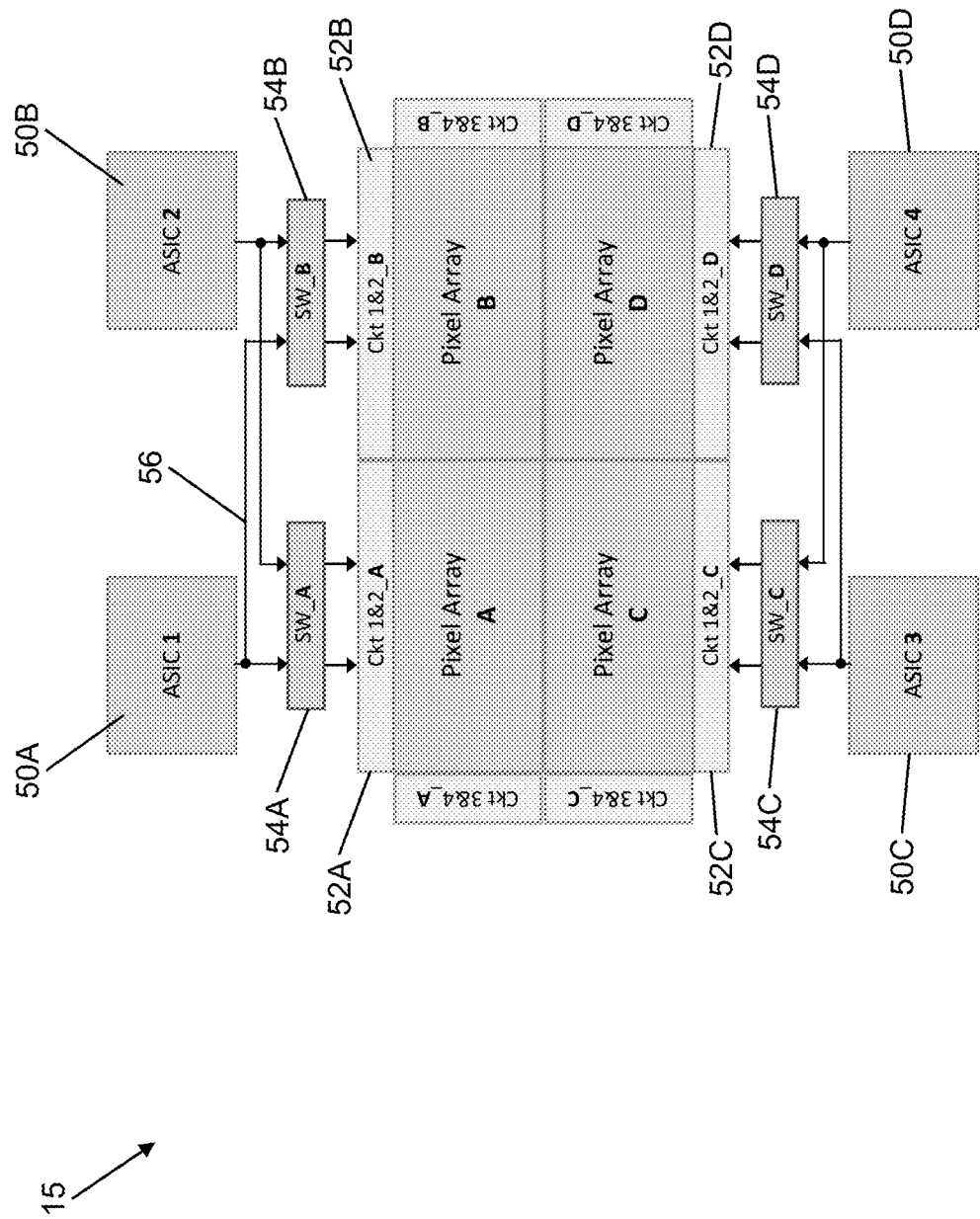
FIG. 6 illustrates an exemplary device such as a finger sensor having a multi-segment pixel matrix (e.g., that of FIG. 4C for illustration) with switches in accordance with some embodiments.

Referring to FIG. 6, in some embodiments, the sensor or device 15 in the system 100 may further comprise a plurality of switches 54 (e.g., labeled as 54A, 54B, 54C, and 54D). The label "SW" in FIG. 6 means a switch. Each switch 54 is connected with one or more supporting circuits 52 and one or more ASICs 50. Each pixel array 36 is configured to be independently driven and scanned by one or more of the plurality of the ASICs 50 through one or more switches 54. In some embodiments, such a switch 54 is an electronic contact switch. The signal from the thermal sensing elements in a pixel array may be addressed and controlled using an electronic contact switch, e.g. a double gate MosFET transistor.

In some embodiments, the plurality of ASICs 50 and the sensor 10 are disposed together within a biometric sensing device 15. The sensor or device 15 illustrated in FIGS. 5B and 6 is a part of the system 100. As described in FIG. 1, the system 100 may further comprise a microcontroller unit (MCU) 60 coupled to the plurality of ASICs 50. The MCU 60 comprises one or more processor and at least one tangible, non-transitory machine readable medium encoded with one or more programs configured to process the image data and/or control operation of the system. In some embodiments, the number of ASICs may correspond to the number of the pixel arrays. The system 100 may include only one MCU 60.

With a switch 54, a user can choose to one ASIC 50 dedicated for each pixel array 36, or having multiple ASICs 50 processing one pixel array 36 to improve scanning speed and bandwidth. One powerful MCU 60 can be used to manage all the ASICs 50 and the MCU 60 can decide how to best arrange resources to minimize scan time, to improve scan quality, or both.

Referring to FIG. 6, in some embodiments, each pixel array segment 36 can be independently driven and simultaneously scanned by multiple ASICs 50. In the arrangement shown in FIG. 6, multiple ASICs 50 can operate together to collect fingerprint image from the same pixel array segment 36 at the same time. This arrangement is particularly useful to collect fingerprint image from one or more specific pixel array segments 36. Scan resources are redirected to work in parallel accelerating fingerprint scan for specific local areas.

The FAP60 sensing area (81.3×76.2 mm) is much larger compared to the fingerprint size. Even for the 4-finger scan, fingerprints only occupy a small portion of the total sensing area. In most situations, fingerprints cover less than 15% of the total sensing area.

In another aspect, at least two steps of a selective thermal scan can be used in accordance with some embodiments. A coarse low-resolution thermal scan is used to detect and locate fingerprints so that the high-resolution thermal scan is performed to capture image only at the sensing areas where fingerprints are located. Instead of collecting a full image from the whole sensing area, sensing system intelligently selects the areas of interest for the detail fingerprint thermal scan, significantly decreasing thermal scan activities. Therefore, scan time and scan energy consumption are proportionally reduced.

A scan resolution is high when it is 500 dpi or above. 500 dpi is the FBI FAP sensor standard for fingerprint image collection. Low scan resolution may be 100 dpi or lower, for example. The objective is mainly to locate where a finger is at or where the fingerprint boundary is so that no time or effort is wasted on scanning areas without value.

Figure 7:
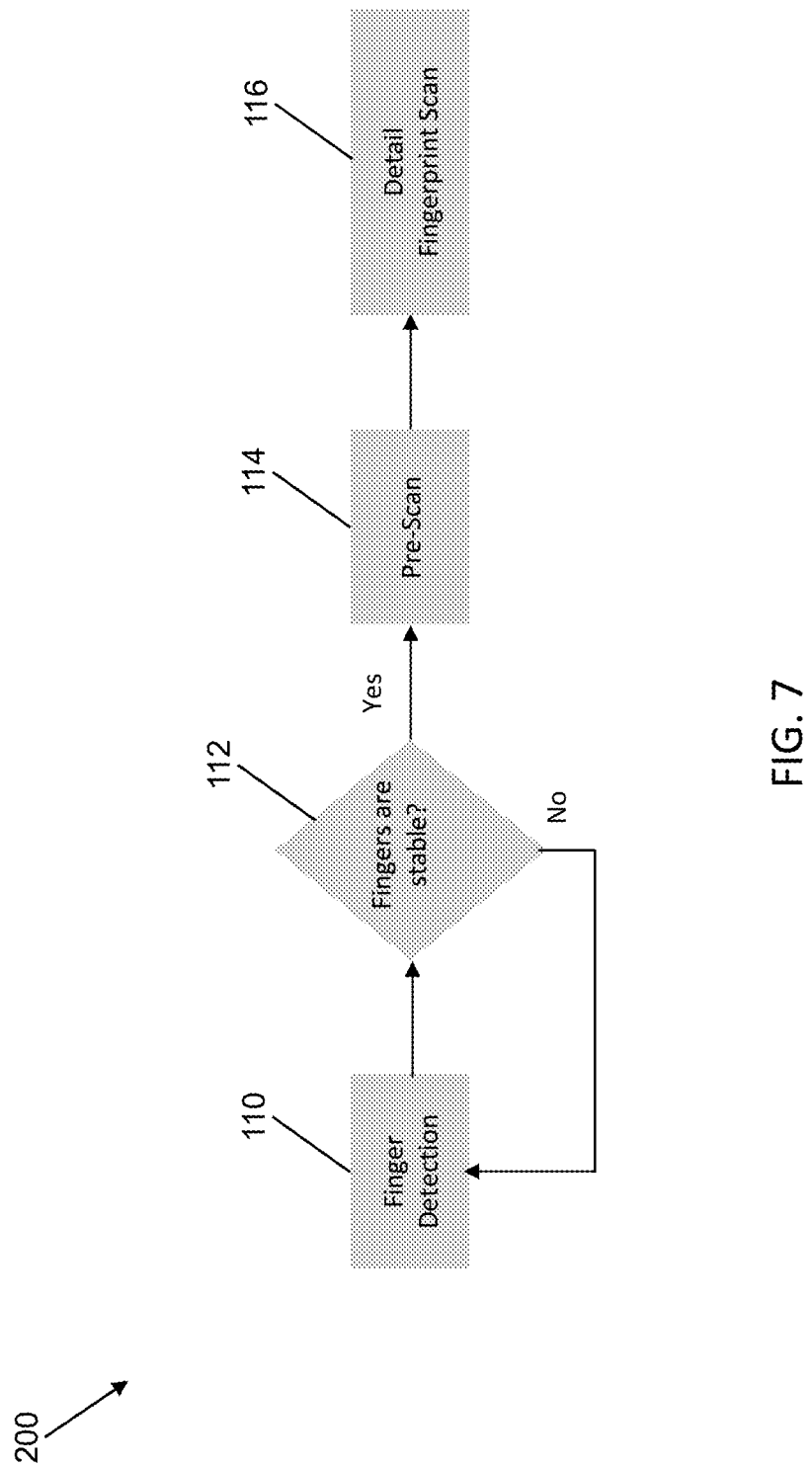
FIG. 7 is a flow chart illustrating a method of selective active thermal scan using an exemplary device such as a finger sensor having a multi-segment pixel matrix (or called multiple pixel arrays) in accordance with some embodiments.

Through the MCU 60, the system 100 is configured to perform the functions and steps as described herein. Referring to FIG. 7, for example, an exemplary method 200 comprises at least three steps. A first step is to detect a presence of an object having a biometric pattern on the sensor. A second step is to perform a coarse scan by scanning a fraction of pixels in a pixel array to determine a contact boundary between the object and the sensor. A third step is to perform a detailed scan selectively within the contact boundary to provide the image data of the biometric pattern.

Referring to FIG. 7, during a standby mode, as shown in block 110, the sensing system 100 periodically executes an initial thermal scan (or by capacitive scan using capacitive sensing grid described below in FIG. 9) at a low resolution to detect the presence of finger touch(es) on the sensor. Only a small percentage of pixels (for example, 2%) evenly spread across the sensor pixel array are selected for the finger detection. Once finger touches are detected and are found to be in stable contact with the sensor (block 112), the system 100 enters the next pre-scan (a coarse thermal scan) stage selecting another set of pixels around the identified finger touch areas to determine fingerprint boundaries (block 114). The system 100 could select a higher percentage of pixels (for example, 8%) around the identified touch areas to improve boundary computation precision. Afterward, as shown in block 116, a thermal scan with full resolution (i.e., a detailed thermal) is performed to collect detail fingerprint image within the identified boundaries. The fingerprint scan area is only a small subset of the full pixel array.

Figure 8:
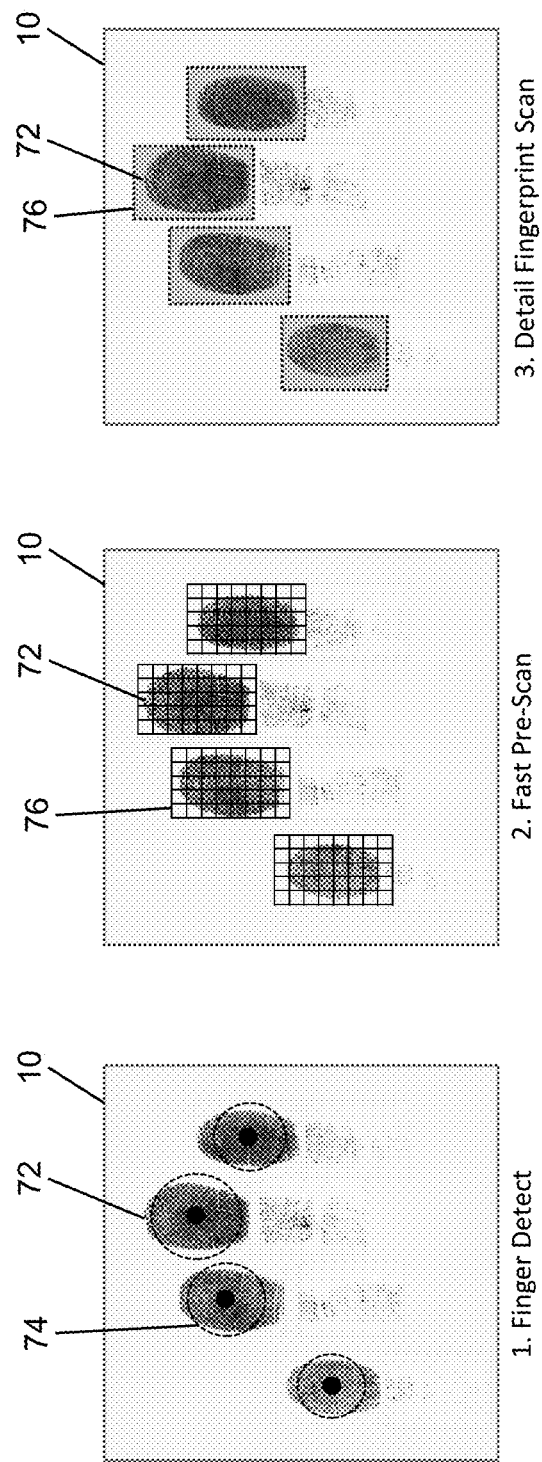
FIGS. 8A-8C illustrate the fingerprints from three steps of the method of FIG. 7, including finger detection (FIG. 8A), fast pre-scan (FIG. 8B), and detailed fingerprint scan (FIG. 8C), in accordance with some embodiments.

Referring to FIG. 8, examples of the steps in FIG. 7 are further illustrated, including finger detection (FIG. 8A), fast pre-scan (FIG. 8B), and detailed fingerprint scan (FIG. 8C). The fingerprint 72 and the touch area 74 and the scan area 76 are shown in FIGS. 8A-8C.

By using the method 200, the selective scanning method not only greatly improves image scanning and energy consumption, but also considerably reduces subsequent image processing computational efforts and the memory requirement.

By combining both the multi-segment sensing and the selective thermal scan, image sensing bandwidth and throughput are more than one order of magnitude higher than those in the conventional technology. This will significantly close the scan time performance gap enabling a fingerprint sensor to meet the FAP60 sensor requirements, while the low image scan power consumption makes it favorable over the existing counterparts such as existing optical technology.

The steps in the method 200 may also include those for detecting rolling motion and location, combining images, and processing and comparing image data as described in the present disclosure.

In another aspect, the large fingerprint sensor can be further enhanced for mobile applications by integrating capacitive scan to achieve an ultra-low standby mode power consumption. Using coarse thermal scan for finger detection often runs into a tradeoff between power consumption and detection response; it is desirable to detect finger presence more frequently to improve system response, but standby power will increase proportionally. Capacitive scan runs considerably faster and consumes lower power than thermal scan. Integrating capacitive scan allows sensing system to detect finger touch more often while maintaining a very low standby power consumption. In addition, the projected capacitance field generated by each capacitive sensing node covers a much wider area and a larger three-dimensional (3-D) space than a thermal scan pixel. A proper placement of capacitive sensing nodes can provide a continuous and broader detection coverage across the entire pixel array. In addition to more frequent detection, capacitive scan improves finger detection accuracy and resolution, a potentially more effective solution at a lower operating cost.

Figure 9:
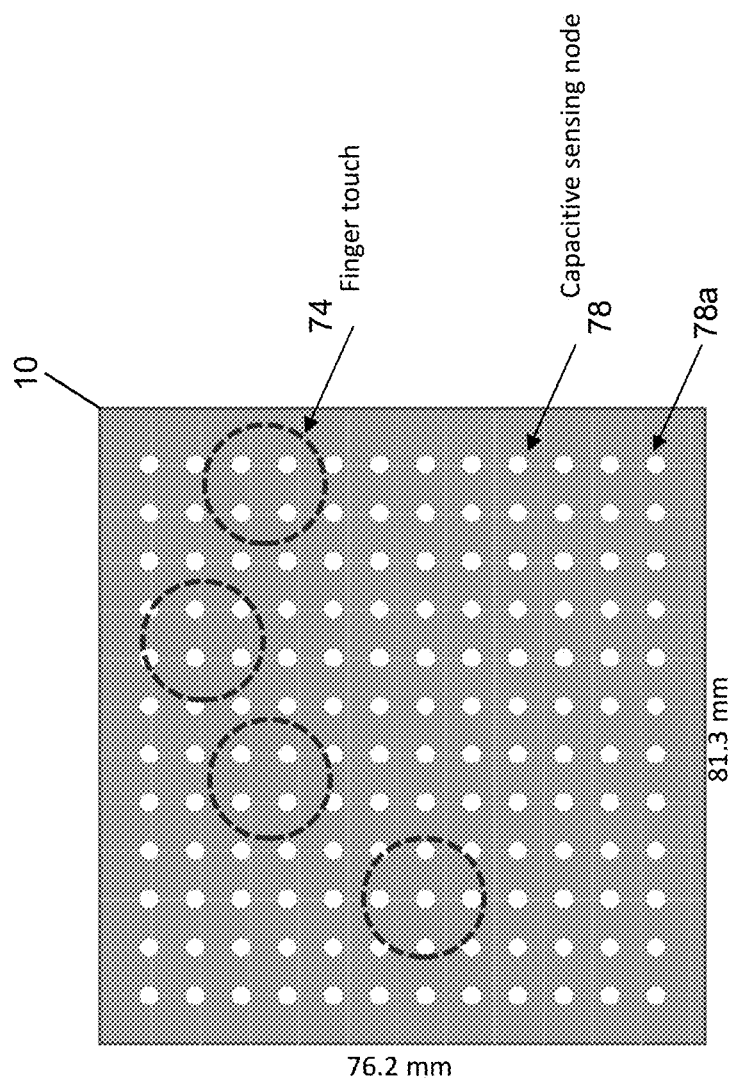
FIG. 9 illustrates an exemplary sensor such as a finger sensor having both a multi-segment pixel matrix and a 2-D capacitive sensing grid having capacitive sensing nodes in accordance with some embodiments.

Referring to FIG. 9, in accordance with some embodiments, an exemplary sensor 10 further comprises a capacitive sensing grid 78, which comprising capacitive sensing nodes 78a (illustrated as dots in FIG. 9) distributed in each pixel array 36 or in the pixel matrix 16. The lines in FIG. 9 represent the pixel array 36 for thermal scans. The system or device may further comprise an auxiliary circuit (not shown) for the capacitive sensing grid 78 in a respective ASIC or in the MCU. The auxiliary circuit can be also an independent IC outside the respective ASIC or the MCU. The capacitive sensing grid 78 is connected with the auxiliary circuit. To enable a capacitive scan, a 2-D grid of capacitive sensing nodes 78a across the active sensing area is integrated into the fingerprint sensor 10 as illustrated in FIG. 9. The grid 78 of capacitive sensing nodes 78a is coarser than the pixel array 36 having thermal sensing pixels 19. The grid 78 can be implemented in each pixel array 36 or implemented in the pixel matrix 16.

Because of the improved detection accuracy and resolution, the fast capacitive scan can be used not only to identify the presence of finger(s) on sensor during standby mode, but also to locate the position and estimate the size of each finger touch more precisely. Once fingers are in stable contact with the sensor, system runs a similar coarse thermal scan (fast Pre-Scan) to confirm finger presence and to compute the proper fingerprint boundaries.

In some embodiments, the 2-D grid of capacitive sensing nodes can be implemented using mutual capacitive sensing with X number of transmitting electrodes (Tx) and Y number of receiving electrodes (Rx). Passive-matrix addressed mutual capacitive scan supports multi-touch capability and is relatively low cost. The Tx and Rx electrodes can be embedded into the fingerprint sensor and evenly spaced across the pixel array. In one example, Tx electrodes are evenly spaced across the long side of the pixel array with K number of pixels in between 2 adjacent electrodes. Rx electrodes are evenly spaced across the short side of the pixel array with M number of pixels in between 2 adjacent electrodes. K and M are adjustable numbers based on the product resolution and other performance specifications. In another example, Tx electrodes are evenly spaced across the short side of the pixel array and Rx electrodes are evenly spaced across the long side of the pixel array.

In another embodiment, the 2-D grid 78 of capacitive sensing nodes are implemented using active-matrix addressed self-capacitive sensing. Self-capacitive sensing can offer higher sensitivity and higher touch resolution than mutual-capacitive sensing at a cost of more signal routings and implementation overhead to address the self-capacitive sensing nodes.

The selective thermal scan not only notably reduces fingerprint scan area, but also empowers the sensing system to be able to determine a custom fingerprint boundary specifically for each finger optimizing scan coverage and further minimizing unnecessary scan activities. With a large sensor like FAP60, fingerprints could come in at any angle as long as they are within the sensing area. Fingerprints could be rotated on the sensing area, or each finger could be orientated differently.

Figure 10:
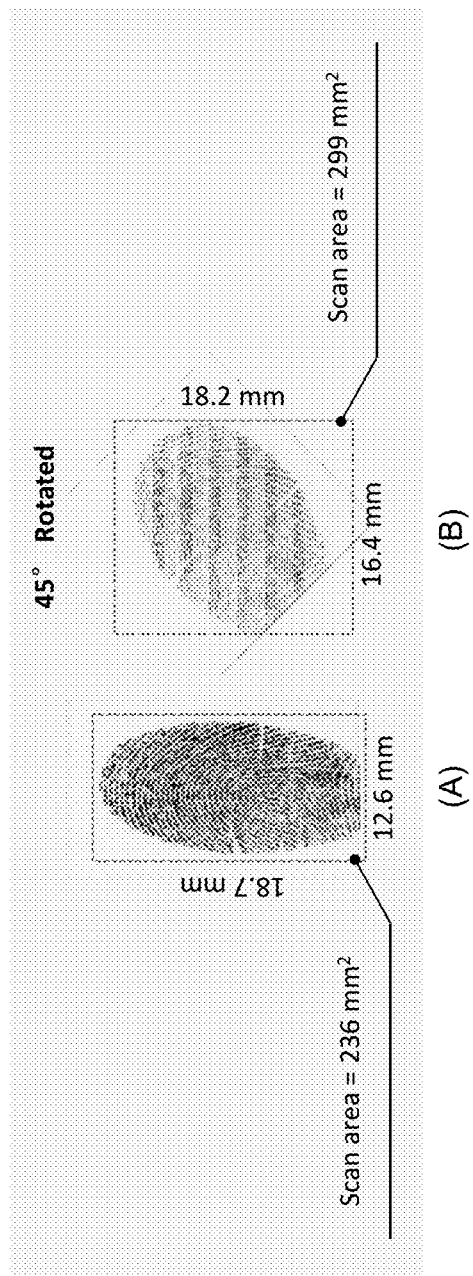
FIG. 10 shows two examples of rectangular fingerprint scan boundary for a finger in an unrotated state (A) and a rotated state.
Figure 11:
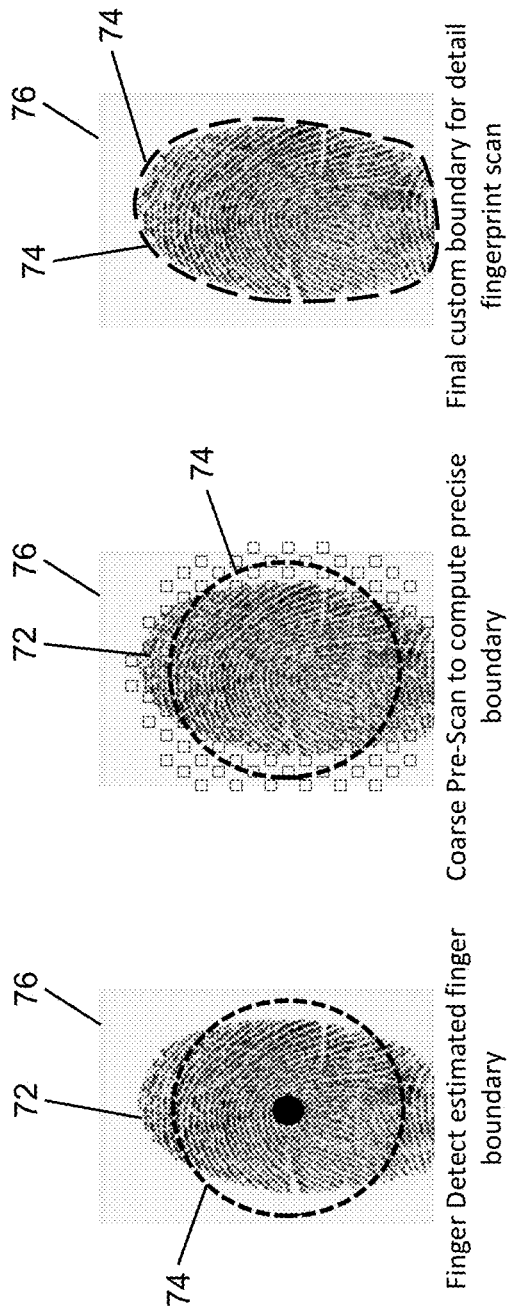
FIGS. 11A-11C illustrate three examples of fingerprint scan boundary in the three steps of the method of FIG. 7, including finger detection (FIG. 11A), fast pre-scan (FIG. 11B), and detailed fingerprint scan (FIG. 11C), in accordance with some embodiments.

As illustrated in FIG. 10, the two fingerprints are identical with the one on the right rotated by 45°. To cover the complete fingerprint, rectangular scan boundary for the rotated fingerprint requires scanning roughly 25% larger area as compared to the unrotated one, more empty pixels are scanned proportionally driving up scan time and energy consumption.

The accuracy of finger touch location and size estimate is much improved with the use of capacitive scan. The fast Pre-Scan therefore can better rely on the finger information collected from capacitive scan and strategically select a small amount of thermal sensing pixels around the projected fingerprint perimeter to compute a more precise and customized fingerprint outline for the subsequent detail fingerprint thermal scan. Instead of using a fixed size or a rectangular boundary 76, scan boundary 74 can be irregular and tailor-made for each detected fingerprint 72 as illustrated in FIGS. 11A-11C. This further minimizes unnecessary scan activity over the non-contact or unoccupied pixels which helps maintain a more consistent scan time between rotated and unrotated fingers.

In another aspect, the present disclosure provides a sensor or device 15 for biometric sensing as described herein. Such a device 15 comprises a sensor 10 comprising a pixel matrix 16 having two or more pixel arrays 36 as separate segments logically divided in the pixel matrix 16, and a plurality of ASICs 50 coupled to the sensor 10. Each ASIC 50 is configured to capture image data of a biometric pattern of an object measured by at least one pixel array 36. Each pixel array 36 is configured to be independently driven and scanned by one or more of the plurality of the ASICs 50. In some embodiments, the sensor 10 is a fingerprint sensor, the object is a finger 70, and the biometric pattern is a fingerprint 72.

In some embodiments, each pixel array 36 comprises a plurality of pixels arranged in a plurality of rows and a plurality of columns, and the plurality of pixels comprise thermal sensing pixels. Each pixel array may further comprise a capacitive sensing grid 78 comprising capacitive sensing nodes 78a distributed in each pixel array 36. The capacitive sensing grid 78 is configured to detect a presence of the object, and/or rolling motion and location of the object. The capacitive sensing nodes 78a may be mutual capacitance sensing nodes or self-capacitance sensing nodes. The self-capacitance sensing nodes are configured to be passive-matrix addressed, or active-matrix addressed by an array of thin film transistors. The mutual capacitance sensing nodes are configured to be passive-matrix addressed.

The device 15 may further comprise the switches as described herein. The device 15 may also comprise a microcontroller unit (MCU) 60 coupled to the plurality of ASICs 50. The MCU 60 comprises one or more processor and at least one tangible, non-transitory machine readable medium encoded with one or more programs configured to process the image data and/or control operation of the device as described herein.

Table 2 summarizes results of a 4-finger test case study on the experimental examples (FAP 60 sensors) in accordance with some embodiments. The FAP60 active sensing area is logically divided into 8 segments using the multi-segment architecture and each segment is driven and scanned by an individual ASIC. Because the segments are scanned in parallel, full-image scan time is drastically reduced from 13.8 sec to 1.73 sec, eight times faster than the conventional solution. With the selective thermal scan enabled, only fingerprint areas are scanned, and scan time further reduces to 0.67 sec, roughly another 2.5 times faster. The fast pre-scan requires additional time for boundary evaluation and image processing, but this overhead is significantly smaller compared to the time savings from the detail fingerprint image scan. In addition, the total image scan energy consumption is roughly 5 times smaller. Sensor pixel array segments without finger touch are disabled and only the sensor pixels where fingerprints make contact with are activated; this translates to substantially less image scan and processing activities. Further enabling the customer scan boundary feature allows the scan boundaries to more tightly fit around each fingerprint outline bypassing the non-contact pixels, resulting in additional scan time and energy consumption savings. By implementing these innovative features, the test case study shows that scan time is reduced by more than 20 times while energy consumption is reduced by nearly 6 times.

TABLE 2

| | Scan Time | | Energy Consumption | |
| --- | --- | --- | --- | --- |
| | Estimate | Normalized | Estimate | Normalized |
| Conventional Architecture (single pixel array) | 13.8 sec | 22.6 | 577 mJ | 5.84 |
| Multi-Segment Architecture (8 segments) | 1.73 sec | 2.83 | 577 mJ | 5.84 |
| Multi-Segment Architecture (8 segments) + Selective Thermal Scan (w/ capacitive scan) | 0.67 sec | 1.10 | 109 mJ | 1.10 |
| Multi-Segment Architecture (8 segments) + Selective Thermal Scan (w/ capacitive scan) + Custom Scan Boundary | 0.61 sec | 1 | 98.8 mJ | 1 |

As shown in Table 2, compared to the single pixel array, the performance improvement using the multi-segment architecture is significant, including faster scan time and lower total power consumption. The image scan time can be dropped from 13.8 to 0.61 sec (more than 20 times faster), while energy consumption reduces by almost 6 times. These are huge performance improvement. Because of the much improved image scan bandwidth, even a moving/rolling finger can be scanned. This enables a new product feature that we currently cannot support.

In addition to improving finger touch evaluation, the interoperation between capacitive scan and thermal scan empowers the sensing system to support finger roll scan for capturing the fingerprint within a short time. The integration of fast capacitive scan enables the sensing system to dynamically track finger movement, determine the proper thermal scan boundaries on the fly, and optimize fingerprint scan operation as finger is rolling across the sensing area for fingerprint capture. In other words, it provides the necessary capabilities to create an intelligent sensing system leveraging the available scan resources to capture a continuous rolling fingerprint.

Figure 12:
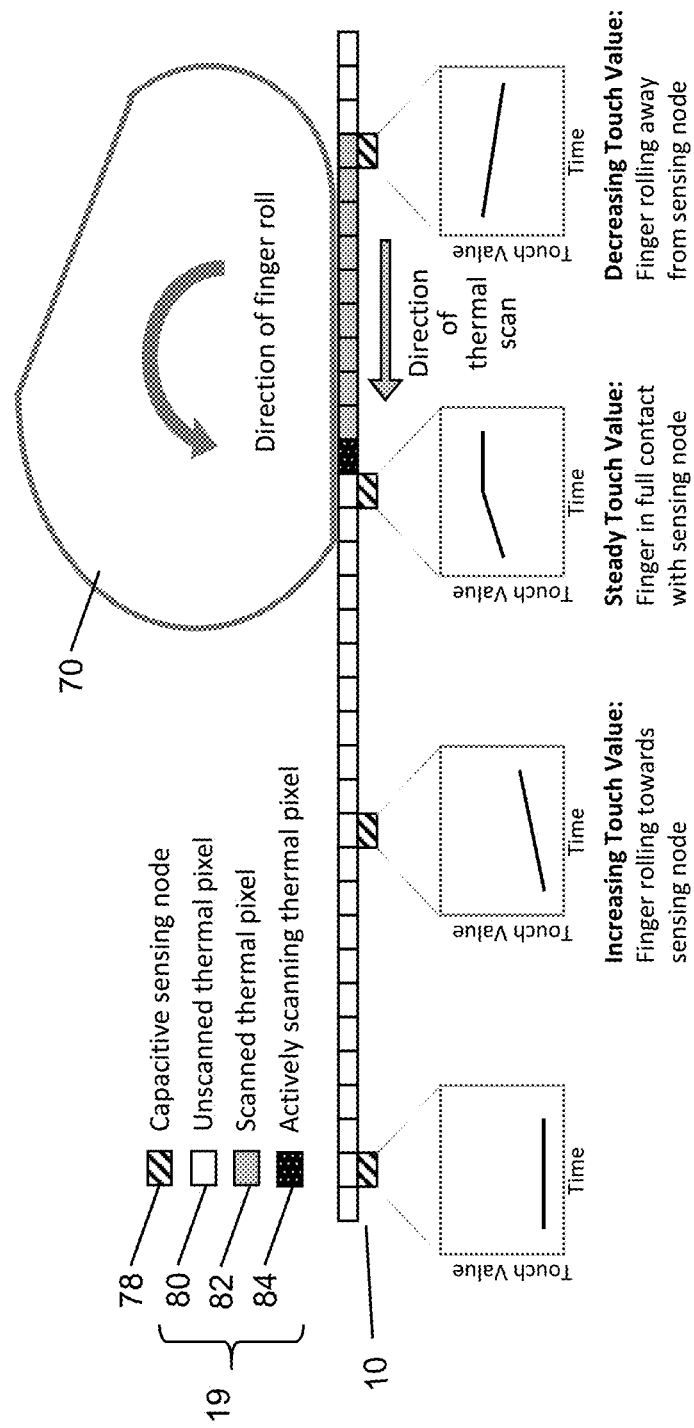
FIG. 12 illustrates a process of finger rolling scan operation using the exemplary system in accordance with some embodiments.

FIG. 12 illustrates an example of operation, in which capacitive sensing nodes 78 are implemented using self-capacitive sensing. The touch value detected by each capacitive sensing node 78 changes as a finger 70 rolling across the sensing area. Touch value increases as a finger approaches, remains constant if it is in full contact, and decreases when the finger rolls away. By continuously monitoring the touch values, sensing system will be able to precisely locate the moving finger 70 at any given moment. Instead of scanning from an arbitrary starting point, the exemplary sensing system 100 can enable the corresponding section of thermal sensing pixels 19 in the pixel array 36 where the rolling finger 70 is currently at as well as to select a smaller subset of pixels currently in contact with the finger 70 to collect detail fingerprint image. In FIG. 12, the unscanned thermal pixels 80, scanned thermal pixels 82 and the actively scanning thermal pixels 84 for a pixel array 36 in the sensor 10 are shown. With this finger tracking capability, thermal scan can be better aligned with the rolling finger in time, location and contact area (scan size) optimizing image scan quality and bandwidth.

Figure 13:
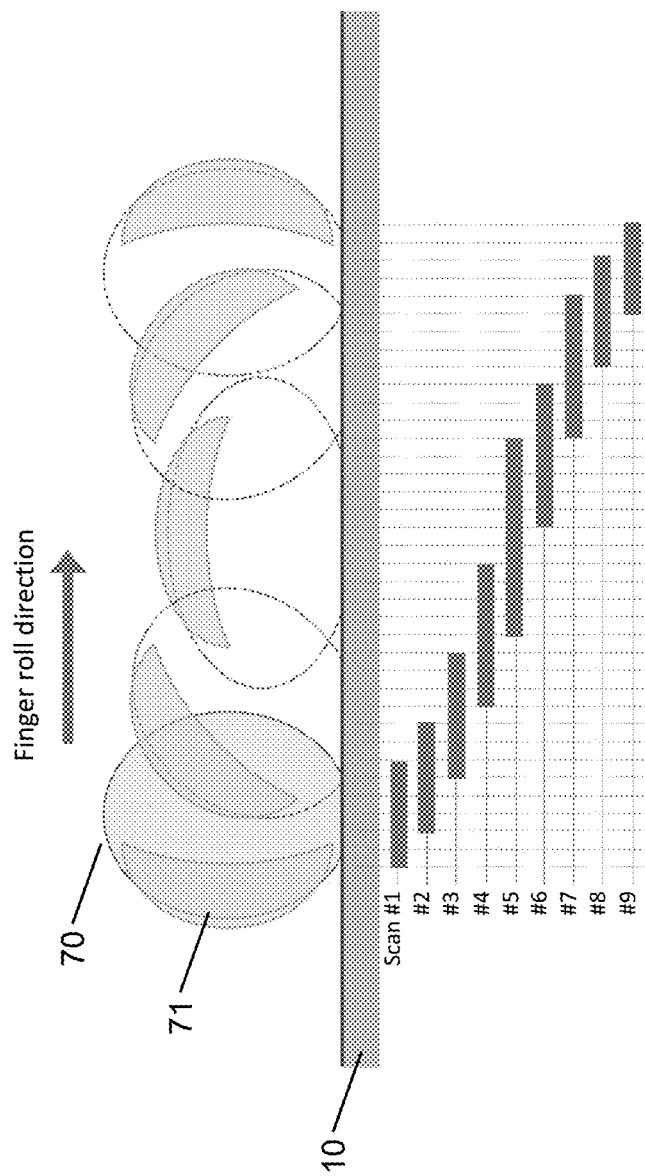
FIG. 13 illustrates a process of continuously capturing images of a rolling finger using the exemplary system in accordance with some embodiments.

One technique to improve image quality and signal-to-noise ratio (SNR) is to average multiple images of the same fingerprint area to produce a final image. In some embodiments, because of the higher image scan bandwidth, the sensing system 100 can be configured to continuously capture the rolling finger 70 on the sensor 10 so that the same print area is captured multiple times in consecutive scans as illustrated in FIG. 13. The images are then combined together during image processing to create a complete roll fingerprint, and the duplicated sections are averaged to improve image quality and SNR. In FIG. 13, the number of scans (9) is for illustration only, and can be any suitable number.

Figure 14:
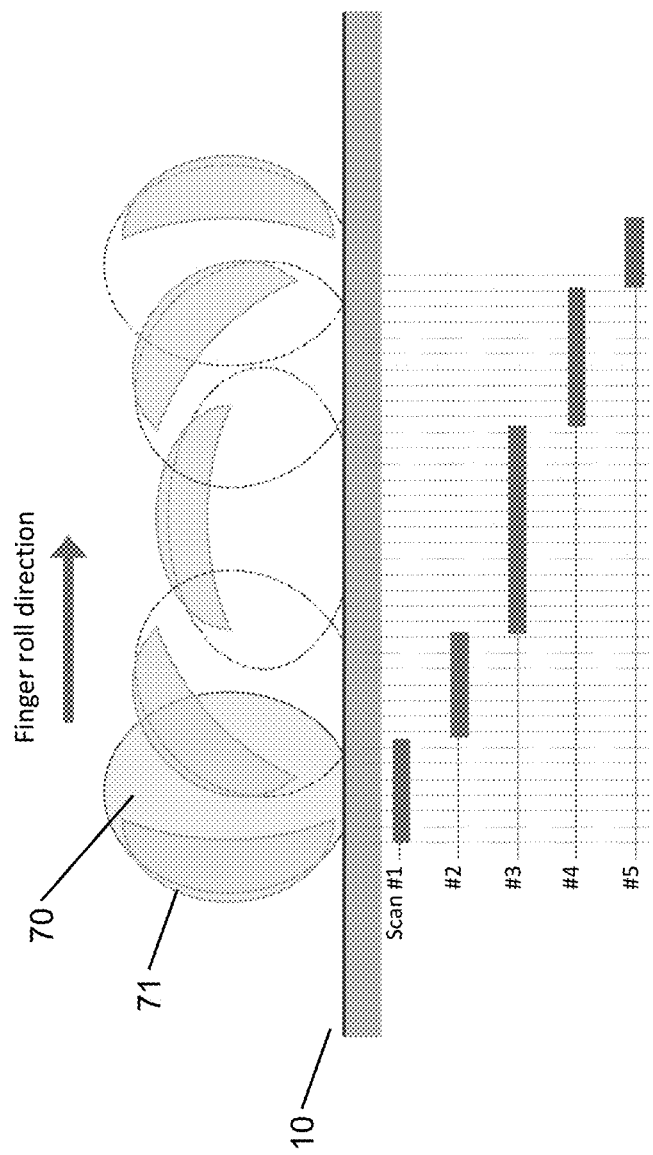
FIG. 14 illustrates a process of capturing images of a rolling finger with minimal image capture times using the exemplary system so as to reducing the total image scan power consumption in accordance with some embodiments.

In some embodiments, the sensing system 100 can be configured to minimize duplicated image captures reducing total image scan power consumption. For example, the sensing system 100 can be set up such that any given fingerprint area is scanned once as illustrated in FIG. 14. The total number of scans and scan activities are minimized to save power. For examples, as illustrated in FIGS. 13-14, the total number of scans can be decrease from 9 to 5. The optimal total number of scans for each rolling finger may be in a range of 3 to 7.

Figure 15:
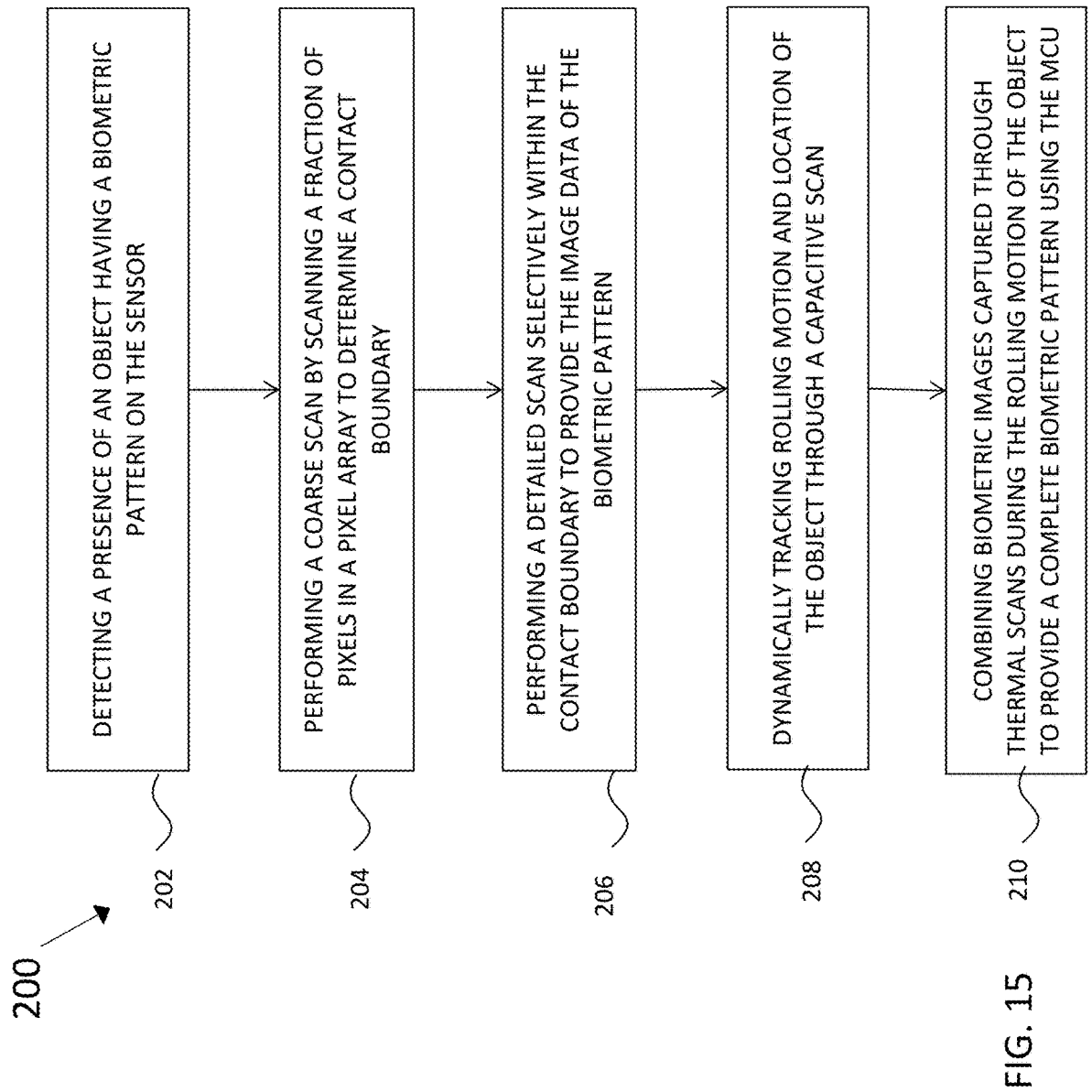
FIG. 15 is a flow chart illustrating an exemplary method for biometric sensing in accordance with some embodiments.

Referring to FIG. 15, as described above, an exemplary method 200 for biometric sensing in accordance with some embodiments is generally described. The method 200 is for using a device or a system comprising the exemplary sensor 10 as described. Such a sensor 10 comprises a pixel matrix 16 having two or more pixel arrays 36 as separate segments logically divided in the pixel matrix 16. Such a method 200 comprises steps 202, 204, ad 206.

At step 202, a presence of an object having a biometric pattern on the sensor 10 is detected. In some embodiments, the sensor 10 is a fingerprint sensor, the object includes at least one finger 70, and the biometric pattern is a fingerprint 72. As described herein, the sensor has a pixel matrix 16 with multiple segments. Each pixel array 36 comprises a plurality of pixels arranged in a plurality of rows and a plurality of columns. The plurality of pixels 18 comprise thermal sensing pixels 19. Each pixel array 36 may further comprise a capacitive sensing grid 78 having capacitive sensing nodes distributed in each pixel array.

At step 204, a coarse scan (a pre-scan) is performed by scanning a fraction of pixels in a pixel array to determine a contact boundary between the object and the sensor. In such a method, the presence of an object such as a finger 70 touch on the sensor 10 is detected through the thermal sensing pixels 19 or the capacitive sensing nodes 78. The coarse scan and the detailed scan are performed through the thermal sensing pixels.

At step 206, a detailed scan selectively within the contact boundary is performed to provide the image data of the biometric pattern.

At step 208, as described in FIGS. 12-14, rolling motion and location of the object is dynamically tracked through a capacitive scan using the capacitive sensing nodes 78. In some embodiments, the capacitive sensing nodes 78 are mutual capacitance sensing nodes or self-capacitance sensing nodes. The self-capacitance sensing nodes may be passive-matrix addressed, or active-matrix addressed by an array of thin film transistors. The mutual capacitance sensing nodes are configured to be passive-matrix addressed.

At step 210, biometric images of the object captured through thermal scans during the rolling motion of the object are combined to provide a complete biometric pattern using the MCU. Step 210 may include one or multiple steps.

The present disclosure provides at least the products and methods described in the following clauses, which are examples only and do not limit the scope of the disclosure.

1. A system for biometric sensing, comprising:
    a sensor comprising a pixel matrix having two or more pixel arrays as separate segments logically divided in the pixel matrix;
    a plurality of application-specific intergrade circuits (ASICs) coupled to the sensor, wherein each ASIC is configured to capture image data of a biometric pattern of an object measured by at least one pixel array, and each pixel array is configured to be independently driven and scanned by one or more of the plurality of the ASICs; and
    a microcontroller unit (MCU) coupled to the plurality of ASICs and comprising one or more processor and at least one tangible, non-transitory machine readable medium encoded with one or more programs configured to process the image data and/or control operation of the system.
2. The system of clause 1, wherein the pixel matrix comprises from 2 to about 12 pixel arrays.
3. The system of any of clauses 1-2, wherein the plurality of ASICs and the sensor are disposed together within a biometric sensing device.
4. The system of any of clauses 1-3, wherein the sensor further comprises a plurality of supporting circuits, wherein each pixel array is connected with at least one supporting circuit.
5. The system of any of clauses 1-4, further comprising a plurality of switches, wherein each pixel array is configured to be independently driven and scanned by one or more of the plurality of the ASICs through one or more switches.
6. The system of any of clauses 1-5, wherein each pixel array comprises a plurality of pixels arranged in a plurality of rows and a plurality of columns.
7. The system of any of clauses 1-6, wherein each pixel array comprises thermal sensing pixels and is configured to operate based on the active thermal sensing principle, in which a power heat pulse is applied to each pixel array and a response corresponding to a biometric pattern is measured.

8. The system of any of clauses 1-7, wherein a pixel in each pixel array comprises one or more diodes connected in series between a pixel row line and a pixel column line.
9. The system of any of clauses 1-8, wherein each pixel array further comprises a capacitive sensing grid comprising capacitive sensing nodes distributed in each pixel array.
10. The system of clause 9, further comprising an auxiliary circuit in a respective ASIC or in the MCU or outside the respective ASIC or the MCU as an independent integrated circuit, wherein the capacitive sensing grid is connected with the auxiliary circuit.
11. The system of any of clauses 1-9, wherein through the MCU, the system is configured to perform steps comprising:
   detecting a presence of an object having a biometric pattern on the sensor;
   performing a coarse scan by scanning a fraction of pixels in a pixel array to determine a contact boundary between the object and the sensor; and
   performing a detailed scan selectively within the contact boundary to provide the image data of the biometric pattern.
12. A device for biometric sensing, comprising:
   a sensor comprising a pixel matrix having two or more pixel arrays as separate segments logically divided in the pixel matrix; and
   a plurality of application-specific intergrade circuits (ASICs) coupled to the sensor, wherein each ASIC is configured to capture image data of a biometric pattern of an object measured by at least one pixel array, and each pixel array is configured to be independently driven and scanned by one or more of the plurality of the ASICs.
13. The device of clause 12, wherein the sensor is a fingerprint sensor, the object is a finger, and the biometric pattern is a fingerprint.
14. The device of any of clauses 12-13, wherein each pixel array comprises a plurality of pixels arranged in a plurality of rows and a plurality of columns, and the plurality of pixels comprise thermal sensing pixels.
15. The device of any of clauses 12-14, wherein each pixel array further comprises a capacitive sensing grid comprising capacitive sensing nodes distributed in each pixel array and configured to detect a presence of the object, and/or rolling motion and location of the object.
16. The device of any of clause 15, wherein the capacitive sensing nodes are mutual capacitance sensing nodes or self-capacitance sensing nodes.
17. The device of any of clauses 15-16, wherein the self-capacitance sensing nodes are configured to be passive-matrix addressed, or active-matrix addressed by an array of thin film transistors.
18. The device of any of clauses 15-16, wherein the mutual capacitance sensing nodes are configured to be passive-matrix addressed.
19. The device of any of clauses 12-18, further comprises a microcontroller unit (MCU) coupled to the plurality of ASICs and comprising one or more processor and at least one tangible, non-transitory machine readable medium encoded with one or more programs configured to process the image data and/or control operation of the device.
20. A method of using a device or a system comprising a sensor comprising a pixel matrix having two or more pixel arrays as separate segments logically divided in the pixel matrix, comprising steps of:
   detecting a presence of an object having a biometric pattern on the sensor;
   performing a coarse scan by scanning a fraction of pixels in a pixel array to determine a contact boundary between the object and the sensor; and
   performing a detailed scan selectively within the contact boundary to provide the image data of the biometric pattern.
21. The method of clause 20, wherein the sensor is a fingerprint sensor, the object includes at least one finger, and the biometric pattern is a fingerprint.
22. The method of any of clauses 20-21, wherein each pixel array comprises a plurality of pixels arranged in a plurality of rows and a plurality of columns, the plurality of pixels comprise thermal sensing pixels, and each pixel array further comprises a capacitive sensing grid having capacitive sensing nodes distributed in each pixel array.
23. The method of clause 22, wherein the presence of an object on the sensor is detected through the thermal sensing pixels or the capacitive sensing nodes.
24. The method of any of clauses 22-23, wherein the coarse scan and the detailed scan are performed through the thermal sensing pixels.
25. The method of any of clauses 22-24, further comprising dynamically tracking rolling motion and location of the object through a capacitive scan using the capacitive sensing nodes.
26. The method of any of clauses 21-25, further comprising combining biometric images of the object captured through thermal scans during the rolling motion of the object to provide a complete biometric pattern using the MCU.
27. The method of any of clauses 22-26, wherein the capacitive sensing nodes are mutual capacitance sensing nodes or self-capacitance sensing nodes.
28. The method of any of clauses 22-27, wherein the self-capacitance sensing nodes are passive-matrix addressed, or active-matrix addressed by an array of thin film transistors; and the mutual capacitance sensing nodes are configured to be passive-matrix addressed.

The sensor, the device, the system, and the method provided in the present disclosure provide significant benefits, which the existing technologies cannot provide. For example, the technology provided in the present disclosure provide faster scan time, lower total power consumption, improved image scan bandwidth, capability of scanning a moving/rolling object (such as a finger or multiple fingers), and high resolution. For example, a large fingerprint sensor or system can be provided to meet fingerprint acquisition profile (FAP) standards.

The methods and system described herein may be at least partially embodied in the form of computer-implemented processes and apparatus for practicing those processes. The disclosed methods may also be at least partially embodied in the form of tangible, non-transient machine readable storage media encoded with computer program code. The media may include, for example, RAMs, ROMs, CD-ROMs, DVD-ROMs, BD-ROMs, hard disk drives, flash memories, or any other non-transient machine-readable storage medium, or any combination of these mediums, wherein, when the computer program code is loaded into and executed by a computer, the computer becomes an apparatus for practicing the method. The methods may also be at least partially embodied in the form of a computer into which computer program code is loaded and/or executed, such that, the computer becomes an apparatus for practicing the methods. When implemented on a general-purpose processor, the computer program code segments configure the processor to create specific logic circuits. The methods may alternatively be at least partially embodied in a digital signal processor formed of application specific integrated circuits for performing the methods.

Although the subject matter has been described in terms of exemplary embodiments, it is not limited thereto. Rather, the appended claims should be construed broadly, to include other variants and embodiments, which may be made by those skilled in the art.

What is claimed is:

1. A system for biometric sensing, comprising:
a sensor comprising a pixel matrix having two or more pixel arrays as separate segments logically divided in the pixel matrix, wherein the pixel matrix is a single and continuous pixel matrix;
a plurality of application-specific intergrade circuits (ASICs) coupled to the sensor, wherein each ASIC is configured to capture image data of a biometric pattern of an object measured by at least one pixel array, and each pixel array is configured to be independently driven and scanned by one or more of the plurality of the ASICs; and
a microcontroller unit (MCU) coupled to the plurality of ASICs and comprising one or more processor and at least one tangible, non-transitory machine readable medium encoded with one or more programs configured to process the image data and/or control operation of the system,
wherein the sensor is a fingerprint sensor, the object includes at least one finger, and the biometric pattern is a fingerprint of the at least one finger.

2. The system of claim 1, wherein the pixel matrix comprises from 2 to about 12 pixel arrays.

3. The system of claim 1, wherein the plurality of ASICs and the sensor are disposed together within a biometric sensing device.

4. The system of claim 1, wherein the sensor further comprises a plurality of supporting circuits, wherein each pixel array is connected with at least one supporting circuit.

5. The system of claim 1, further comprising a plurality of switches, wherein each pixel array is configured to be independently driven and scanned by one or more of the plurality of the ASICs through one or more switches.

6. The system of claim 1, wherein each pixel array comprises a plurality of pixels arranged in a plurality of rows and a plurality of columns.

7. The system of claim 1, wherein each pixel array comprises thermal sensing pixels and is configured to operate based on the active thermal sensing principle, in which a power heat pulse is applied to each pixel array and a response corresponding to a biometric pattern is measured.

8. The system of claim 7, wherein a pixel in each pixel array comprises one or more diodes connected in series between a pixel row line and a pixel column line.

9. The system of claim 7, wherein each pixel array further comprises a capacitive sensing grid comprising capacitive sensing nodes distributed in each pixel array.

10. The system of claim 9, further comprising an auxiliary circuit in a respective ASIC or in the MCU or outside the respective ASIC or the MCU as an independent integrated circuit, wherein the capacitive sensing grid is connected with the auxiliary circuit.

11. The system of claim 1, wherein through the MCU, the system is configured to perform steps comprising:
detecting a presence of an object having a biometric pattern on the sensor;
performing a coarse scan by scanning a fraction of pixels in a pixel array to determine a contact boundary between the object and the sensor; and
performing a detailed scan selectively within the contact boundary to provide the image data of the biometric pattern.

12. A device for biometric sensing, comprising:
a sensor comprising a pixel matrix having two or more pixel arrays as separate segments logically divided in the pixel matrix, wherein the pixel matrix is a single and continuous pixel matrix; and
a plurality of application-specific intergrade circuits (ASICs) coupled to the sensor, wherein each ASIC is configured to capture image data of a biometric pattern of an object measured by at least one pixel array, and each pixel array is configured to be independently driven and scanned by one or more of the plurality of the ASICS,
wherein the sensor is a fingerprint sensor, the object includes at least one finger, and the biometric pattern is a fingerprint of the at least one finger.

13. The device of claim 12, wherein each pixel array comprises a plurality of pixels arranged in a plurality of rows and a plurality of columns, and the plurality of pixels comprise thermal sensing pixels.

14. The device of claim 13, wherein each pixel array further comprises a capacitive sensing grid comprising capacitive sensing nodes distributed in each pixel array and configured to detect a presence of the object, and/or rolling motion and location of the object.

15. The device of claim 14, wherein the capacitive sensing nodes are mutual capacitance sensing nodes or self-capacitance sensing nodes.

16. The device of claim 15, wherein the self-capacitance sensing nodes are configured to be passive-matrix addressed, or active-matrix addressed by an array of thin film transistors.

17. The device of claim 15, wherein the mutual capacitance sensing nodes are configured to be passive-matrix addressed.

18. The device of claim 12, further comprises a microcontroller unit (MCU) coupled to the plurality of ASICs and comprising one or more processor and at least one tangible, non-transitory machine readable medium encoded with one or more programs configured to process the image data and/or control operation of the device.

19. A method of using a device or a system comprising a sensor comprising a pixel matrix having two or more pixel arrays as separate segments logically divided in the pixel matrix, comprising steps of:
detecting a presence of an object having a biometric pattern on the sensor;
performing a coarse scan by scanning a fraction of pixels in a pixel array to determine a contact boundary between the object and the sensor; and
performing a detailed scan selectively within the contact boundary to provide image data of the biometric pattern,
wherein the pixel matrix is a single and continuous pixel matrix, and
wherein the sensor is a fingerprint sensor, the object includes at least one finger, and the biometric pattern is a fingerprint of the at least one finger.

20. The method of claim 19, wherein each pixel array comprises a plurality of pixels arranged in a plurality of rows and a plurality of columns, the plurality of pixels comprise thermal sensing pixels, and each pixel array further comprises a capacitive sensing grid having capacitive sensing nodes distributed in each pixel array.

21. The method of claim 20, wherein the presence of an object on the sensor is detected through the thermal sensing pixels or the capacitive sensing nodes.

22. The method of claim 20, wherein the coarse scan and the detailed scan are performed through the thermal sensing pixels.

23. The method of claim 20, further comprising dynamically tracking rolling motion and location of the object through a capacitive scan using the capacitive sensing nodes.

24. The method of claim 23, further comprising combining biometric images of the object captured through thermal scans during the rolling motion of the object to provide a complete biometric pattern using the MCU.

25. The method of claim 20, wherein the capacitive sensing nodes are mutual capacitance sensing nodes or self-capacitance sensing nodes.

26. The method of claim 20, wherein the self-capacitance sensing nodes are passive-matrix addressed, or active-matrix addressed by an array of thin film transistors; and the mutual capacitance sensing nodes are configured to be passive-matrix addressed.

* * * * *